(12) United States Patent
Jain et al.

(10) Patent No.: US 11,934,452 B1
(45) Date of Patent: Mar. 19, 2024

(54) TEXT-BASED COLOR PALETTE SEARCHES UTILIZING TEXT-TO-COLOR MODELS

(71) Applicant: Adobe Inc., San Jose, CA (US)

(72) Inventors: Rohit Jain, Delhi (IN); Syed Mohd Mehadi, Noida (IN); Vishwa Vinay, Bangalore (IN); Jose Ignacio Echevarria Vallespi, South San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/051,417

(22) Filed: Oct. 31, 2022

(51) Int. Cl.
| | | |
|---|---|---|
| *G06F 16/583* | (2019.01) | |
| *G06F 16/532* | (2019.01) | |
| *G06F 16/538* | (2019.01) | |
| *G06F 40/40* | (2020.01) | |
| *G06T 11/00* | (2006.01) | |

(52) U.S. Cl.
CPC ........ *G06F 16/5838* (2019.01); *G06F 16/532* (2019.01); *G06F 16/538* (2019.01); *G06F 40/40* (2020.01); *G06T 11/001* (2013.01)

(58) Field of Classification Search
CPC ... G06F 16/5838; G06F 16/538; G06F 16/532
See application file for complete search history.

(56) References Cited

U.S. PATENT DOCUMENTS

| | | | |
|---|---|---|---|
| 8,406,573 B2 | 3/2013 | Wang et al. | |
| 10,459,971 B2 | 10/2019 | Fu et al. | |
| 11,403,339 B2 * | 8/2022 | Maheshwari | .......... G06N 3/045 |
| 2002/0081024 A1 | 6/2002 | Park et al. | |
| 2010/0125568 A1 | 5/2010 | Van Zwol et al. | |
| 2014/0204109 A1 | 7/2014 | Bose et al. | |
| 2014/0270498 A1 | 9/2014 | Chester et al. | |

(Continued)

FOREIGN PATENT DOCUMENTS

| | | |
|---|---|---|
| EP | 2368200 A2 | 9/2011 |
| JP | 2002197117 A | 7/2002 |

OTHER PUBLICATIONS

Adobe Color: https://color.adobe.comiexplore; 1 page; retrieved from the Internet Aug. 25, 2020., 2020.

(Continued)

*Primary Examiner* — Baoquoc N To
(74) *Attorney, Agent, or Firm* — Keller Preece PLLC

(57) ABSTRACT

The present disclosure relates to systems that perform text-based palette searches that convert a text query into a color distribution and utilize the color distribution to identify relevant color palettes. More specifically, the disclosed systems receive a textual color palette search query and convert, utilizing a text-to-color model, the textual color palette search query into a color distribution. The disclosed systems determine, utilizing a palette scoring model, distance metrics between the color distribution and a plurality of color palettes in a color database by: identifying swatch matches between colors of the color distribution and unmatched swatches of the plurality of color palettes and determining distances between the colors of the color distribution and matched swatches of the plurality of color palettes. The disclosed systems return one or more color palettes of the plurality of color palettes in response to the textual color palette search query based on the distance metrics.

20 Claims, 14 Drawing Sheets
(9 of 14 Drawing Sheet(s) Filed in Color)

(56) References Cited

U.S. PATENT DOCUMENTS

2015/0324366 A1 11/2015 Becker et al.
2019/0325088 A1 10/2019 Dubey et al.

OTHER PUBLICATIONS

Colourlovers: https://www.colourlovers.comicolors; 1 page; retrieved from the Internet Aug. 25, 2020;, 2020.
https://adobe.brightidea.com; retrieved from the Internet Aug. 25, 2020, 2 p. , 2020.
Pantone Color Institute: https://www.pantone.comicolor-consultingiabout-pantone-color-institute; 1 page; retrieved from the Internet Aug. 25, 2020., 2020.
Picular: https://picular.coi; website image retrieved, 1 page, Aug. 25, 2020., 2020.
Burges, Christopher, et al., "Learning to rank using gradient descent." Proceedings of the 22nd International Conference on Machine learning (ICML), 8 pages, 2005., 2005.
Havasi, Catherine , et al., "Automated color selection using semantic knowledge." 2010 AAAI Fall Symposium Series, 6 pages, 2010., 2010.
Heer, Jeffrey, et al., Color naming models for color selection, image editing and palette design. Proceedings of the SIGCHI Conference on Human Factors in Computing Systems. ACM, 10 pages, 2012., 2012.
Lee, Joon-Young, et al., "Automatic content-aware color and tone stylization." Proceedings of the IEEE Conference on Computer Vision and Pattern Recognition, 9 pages, 2016., 2016.
Lindner, Albrecht, et al., "What is the color of chocolate?—Extracting color values of semantic expressions." Conference on Colour in Graphics, Imaging, and Vision. Society for Imaging Science and Technology, 7 pages, 2012., 2012.
Monroe, Will, et al., Colors in context: A pragmatic neural model for grounded language inderstanding. Transactions of the Association for Computational Linguistics, 14 pages, 2017., 2017.
O'Donovan, Peter , et al., "Color compatibility from large datasets." ACM Transactions on Graphics, 8 pages, 2011., 2011.
Pirvu, M.—"Predicting user intent from search queries using both CNNs and RNNs"—arXiv 2018, pp. 1-14 (Year: 2018).
U.S. Appl. No. 16/865,888, Mar. 2, 2022, Preinterview 1st Office Action.
U.S. Appl. No. 16/865,888, May 2, 2022, Notice of Allowance.

* cited by examiner

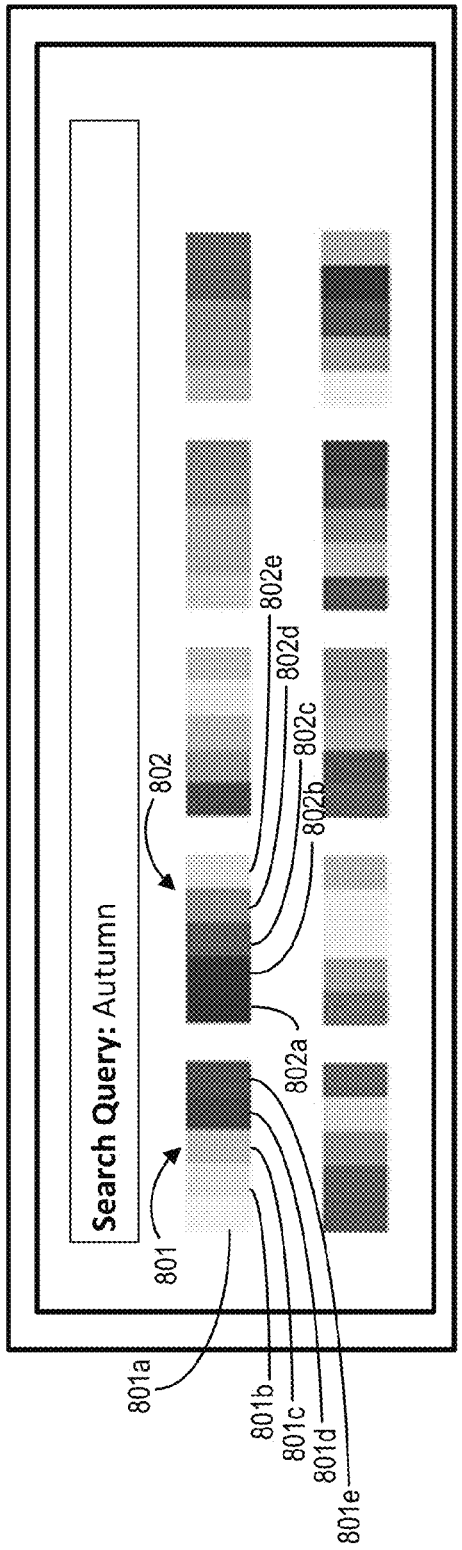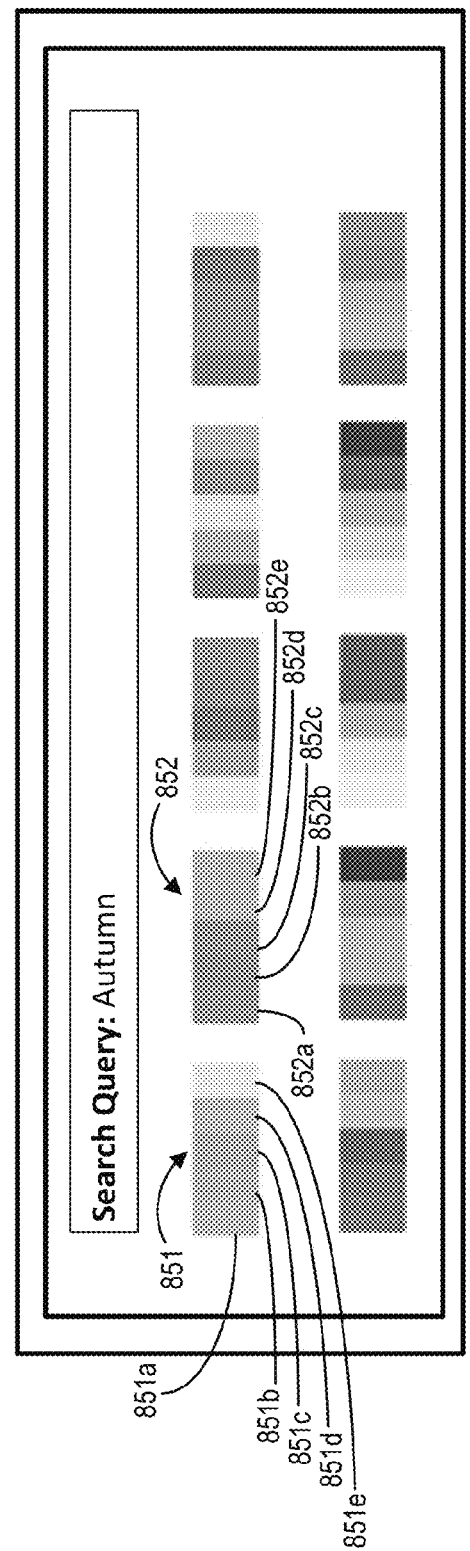

TEXT-BASED COLOR PALETTE SEARCHES UTILIZING TEXT-TO-COLOR MODELS

BACKGROUND

Color plays an important role in graphics, images, and web design because color evokes a reaction from a human observer. Designers often use color palettes when generating designs. Users often search for existing color palettes using textual queries. These textual queries are mapped to metadata (e.g., keywords, tags, title) associated with color palettes to identify color palettes to return as search results.

BRIEF SUMMARY

Embodiments of the present disclosure provide benefits and/or solve one or more of the foregoing or other problems in the art with systems, non-transitory computer-readable media, and methods of performing a text-based palette search that converts an input text query into a color distribution and uses the color distribution to identify relevant color palettes. More specifically, the disclosed systems utilize the color distribution to score color palettes from a color database based on color-based distances. The disclosed systems return relevant color palettes without using tags or other metadata, and thus, are able to provide relevant color palettes when tags are missing or inaccurate.

The following description sets forth additional features and advantages of one or more embodiments of the disclosed methods, non-transitory computer-readable media, and systems. In some cases, such features and advantages are evident to a skilled artisan from the description or learned by the practice of the disclosed embodiments.

BRIEF DESCRIPTION OF THE DRAWINGS

The detailed description provides one or more embodiments with additional specificity and detail through the use of the accompanying drawings, as briefly described below. The patent or application file contains at least one drawing executed in color. Copies of this patent or patent application publication with color drawing(s) will be provided by the Office upon request and payment of the necessary fee.

FIGS. 8A and 8B illustrate results for a textual color palette search query "autumn" generated by a conventional system and the text-to-color-palette retrieval system, respectively, in accordance with one or more embodiments.

DETAILED DESCRIPTION

Figure 1:
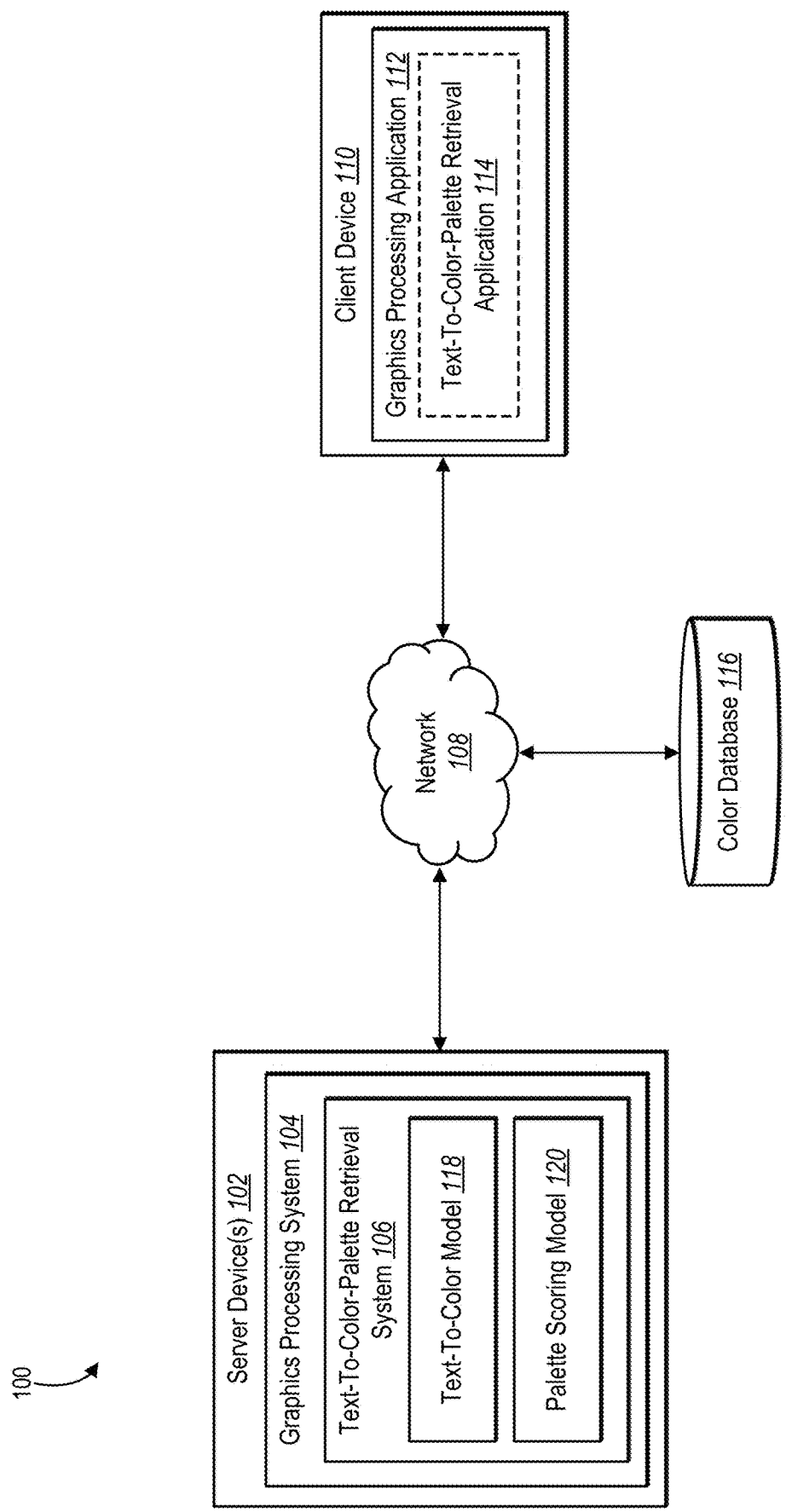
FIG. 1 illustrates a diagram of an environment in which a text-to-color-palette retrieval system operates in accordance with one or more embodiments.

This disclosure relates to embodiments of a text-to-color-palette retrieval system that receives textual color palette search queries representing an intent for a color palette and returns a list of color palettes relevant to the intent utilizing color-based searching and scoring techniques. In particular, the text-to-color-palette retrieval system utilizes a text-to-color model to generate a color distribution that is a multi-color representation of the search query for the color palette. The text-to-color-palette retrieval system finds color palettes from a color database that best match the color distribution utilizing a palette scoring model that is based on color-based distances. The text-to-color-palette retrieval system returns a list of ranked color palettes with the best scores (e.g., the color palettes closest to the intent) as search results in response to the textual color palette search query. The text-to-color-palette retrieval system returns relevant color palettes without using tags or other metadata, and thus, is able to provide relevant color palettes when tags are missing or inaccurate.

As mentioned, the text-to-color-palette retrieval system receives a textual color palette search query and converts the query into a color distribution. For example, the text-to-color-palette retrieval system converts a language-based character string input into a weighted distribution of colors. In this way, the text-to-color-palette retrieval system is able to process the request for color palettes as a color representation rather than a language representation. Typically, the weighted distribution of colors includes several colors relevant to the textual color palette search query. In some embodiments, the text-to-color-palette retrieval system assigns weights to colors of the color distribution based on the relevance of colors of the color distribution to the textual color palette search query. For example, the text-to-color-palette retrieval system utilizes a softmax function of a text-to-color model to assign weights to colors of the color distribution based on relevance of the colors of the color distribution to the textual color palette search query.

The text-to-color-palette retrieval system utilizes the color distribution to determine distance metrics to multiple color palettes in a color database. The text-to-color-palette retrieval system scores the color palettes based on their relevance (closeness) to the color distribution. In some embodiments, the text-to-color-palette retrieval system scores the palettes in a manner that prioritizes color palettes with multiple swatches that are relevant to the search query intent. The text-to-color-palette retrieval system sorts the scores of the color palettes into ascending order and returns the sorted list (ranked palettes) of color palettes for display to a user.

In some embodiments, the text-to-color-palette retrieval system determines distance metrics between the color distribution and each of a plurality of color palettes in a color database. For example, the text-to-color-palette retrieval system determines distance metrics that are numerical representations of how close a particular color palette is to the color distribution (and thus how relevant the color palette is to the color intent of the input textual search query). The text-to-color-palette retrieval system generates distance metrics that include distances between individual color swatches in a color palette and matched colors in the color distribution. In some embodiments, the text-to-color-palette retrieval system determines weighted distances based on weights of the colors of the color distribution and/or color swatches of the color palette. In some embodiments, the text-to-color-palette retrieval system determines distance metrics that comprise a score for the color palette that indicates the relevance of the color palette to the color intent. In some embodiments, the text-to-color-palette retrieval system converts the distance metrics to a score for the color palette that indicates the relevance of the color palette to the color intent.

In some embodiments, the text-to-color-palette retrieval system prioritizes color palettes with multiple swatches relevant to the textual color palette search query over color palettes with a single swatch relevant to the textual color palette search query. In particular, as explained in greater detail below, the text-to-color-palette retrieval system utilizes each swatch in a color palette when determining distance metrics to ensure that a color palette with a single very relevant swatch scores lower than a color palette with multiple relevant swatches.

More specifically, the text-to-color-palette retrieval system assigns swatch matches between the color distribution and each of the plurality of color palettes. For instance, a swatch match comprises a determination of a color of the color distribution that is similar to a swatch of a color palette. The text-to-color-palette retrieval system assigns the swatch matches based on the weights of the colors of the color distribution. For example, the text-to-color-palette retrieval system assigns a top-weighted color of the color distribution as a swatch match with an unmatched swatch of a color palette that is closest in color space to the top-weighted swatch. Upon being assigned to the swatch match with the top-weighted color, the text-to-color-palette retrieval system considers the previously unmatched swatch, a matched swatch. The text-to-color-palette retrieval system determines the next-highest color of the color distribution and assign a swatch match with an unmatched swatch of the color palette that is closest in color space to that next-highest color, disregarding any previously-matched swatches of the color palette. The text-to-color-palette retrieval system continues to assign swatch matches in this successive manner until each swatch of the color palette is assigned to a swatch match, each time excluding swatches of the color palette that have already been assigned to swatch matches. In this manner, the text-to-color-palette retrieval system considers all swatches of the color palette, rather than allowing a strong color swatch (i.e., a highly relevant swatch to the color intent) to dominate the process of determining distance metrics for the color palette.

In some embodiments, the text-to-color-palette retrieval system returns one or more color palettes of the plurality of color palettes in response to the textual color palette search query based on the distance metrics. For example, the text-to-color-palette retrieval system considers the scores of the color palettes determined from the distance metrics and ranks the color palettes in ascending order by score. The text-to-color-palette retrieval system reports a list of the most relevant color palettes to the color intent represented by the textual search query. In some embodiments, the text-to-color-palette retrieval system uses a predetermined threshold (e.g., total number of color palettes to include in the ranked list, or threshold relevance score) to determine the number of color palettes to report. In some embodiments, the text-to-color-palette retrieval system displays the color palettes in the ranked list of search results in a graphical user interface.

The text-to-color-palette retrieval system provides benefits over conventional systems and methods. For example, by prioritizing color palettes with multiple swatches relevant to the color intent of a textual color palette search query over color palettes with only a single swatch relevant to the color intent, the text-to-color-palette retrieval system improves accuracy relative to conventional systems. Specifically, the text-to-color-palette retrieval system scores color palettes based on distance metrics between individual color swatches of the color palettes and matched color of the color distribution. In this manner, the text-to-color-palette retrieval system finds and lists highly relevant color palettes more accurately than conventional systems.

As another example, by including relevant color palettes with incomplete metadata tags, the text-to-color-palette retrieval system improves reliability relative to conventional systems. Specifically, the text-to-color-palette retrieval system considers each color palette in a color database and evaluates the individual color swatches in each color palette for how close the color of the individual color swatch is to the color intent of the search query. In this manner, the text-to-color-palette retrieval system considers the actual colors in the color palette, rather than merely the metadata associated with the color palette. Thus, the absence of keywords or tags in the metadata of a particular color palette that match terms of the search query will not prevent that particular color palette from being located and included with the search results. In this way, the text-to-color-palette retrieval system more reliably captures relevant color palettes and includes them in the ranked list of color palettes in response to the textual color palette search query.

As an additional example, by truncating the color distributions, the text-to-color-palette retrieval system improves efficiency relative to conventional systems. Specifically, the text-to-color-palette retrieval system reduces the size of the color distributions utilizing truncation, which minimizes storage media space required to store the color distribution, and which reduces computational resources required to compare each color palette in a color database to the color distribution. Thus, the text-to-color-palette retrieval system improves efficiency by freeing up memory space and by increasing computational speed.

As a further example, by locating and including relevant color palettes in the search results even for complex textual color palette search queries, the text-to-color-palette retrieval system improves flexibility relative to conventional systems. Specifically, the text-to-color-palette retrieval system generates a color distribution and compares each color palette in a color database to the color distribution to generate search results with relevant color palettes, regardless of the complexity of the textual search query. By contrast, some textual search queries are too complex for conventional systems to handle. In this manner, the text-to-color-palette retrieval system is more flexible than conventional systems.

Additional detail will now be provided in relation to illustrative figures portraying example embodiments and implementations of a text-to-color-palette retrieval system. For example, FIG. 1 illustrates a system 100 (or environment) in which a text-to-color-palette retrieval system 106 operates in accordance with one or more embodiments. As illustrated, the system 100 includes server device(s) 102, a network 108, a client device 110, and a color database 116. As further illustrated, the server device(s) 102, the client device 110, and the color database 116 communicate with one another via the network 108.

As shown in FIG. 1, the server device(s) 102 includes a graphics processing system 104 that further includes the text-to-color-palette retrieval system 106. In one or more embodiments, the text-to-color-palette retrieval system 106 converts textual search queries to color distributions, such as color histograms, utilizing a text-to-color model 118. The text-to-color-palette retrieval system 106 also scores color palettes utilizing a palette scoring model 120. In some embodiments, the server device(s) 102 includes, but is not limited to, a computing device (such as explained below in reference to FIG. 13).

A color palette is a grouping of a plurality of color swatches. For example, a color palette is a group of multiple color swatches that create a theme. In some instances, a color palette is a group of color swatches for display on a user interface.

A color swatch is an instance of an individual color. For example, a color swatch is a storage of an individual color specified by a particular color model, such as RGB, LAB, HSL, or HEX. In some instances, a color swatch is physical or electronic representation of an individual color displayed on a user interface with other color swatches in a color palette.

In some instances, the text-to-color-palette retrieval system 106 receives a request from the client device 110 to retrieve color palettes from a color repository. For example, the request includes a textual color palette search query representing an intent for a particular color scheme. The text-to-color-palette retrieval system 106 performs a lookup in the color database 116 or elsewhere to evaluate a set of color palettes and determine relevance of each palette to the intent represented by the textual query.

A textual color palette search query is text representing a color intent. For example, a textual color palette search query is a user input characterized by language to search for color palettes relevant to an intent to find particular colors or color schemes. In some instances, a textual color palette search query is a string of characters input into a color search model to result in color palettes returned by the color search model.

A color intent is a preference for a particular color representation or color scheme over another color representation or color scheme. For example, a color intent is a desire for a group of colors that evoke a particular reaction in a user. In some instances, a color intent is a preference that colors match a theme.

A color distribution is a group of colors with varying sizes or probabilities for each color in the group of colors. For example, a color distribution is a probability distribution over a number of predefined colors, wherein each color has a probability of being relevant to a color intent of a textual color palette search query. In some instances, a color distribution is a color histogram with weighted colors based on the results of a text-to-color model. In other examples, a color distribution is an ordered list of colors, with the order of the list indicating relative weights or probabilities of the colors being relevant to a color intent of a textual color palette search query.

In one or more implementations, the text-to-color-palette retrieval system 106 generates a truncated color distribution. A truncated color distribution is a color distribution with one or more colors removed. For example, in one or more embodiments, the text-to-color-palette retrieval system 106 removes colors from a color distribution with no weight or low weights. Alternatively, the text-to-color-palette retrieval system 106 truncates a color distribution based on a threshold of probability of relevance, based on a predetermined number of total swatches for the truncation, or based on a combination of both a threshold of probability of relevance and a predetermined total number of swatches for truncation.

An unmatched swatch is a color swatch of a color palette that has yet to be matched with a color of a color distribution. In particular, the term unmatched swatches includes a subset of color swatches in a color palette, wherein each color swatch in the subset has not yet (at a particular act in a scoring process) been matched or paired with a color of the color distribution. To illustrate, in a method for performing the disclosed embodiments, the text-to-color-palette retrieval system 106 considers only unmatched swatches of a color palette while scoring the color palette. When the text-to-color-palette retrieval system 106 assigns a color match between an unmatched color swatch and a color of the color distribution, the unmatched color swatch becomes a matched color swatch and is removed from the subset of unmatched color swatches. In a subsequent iteration of scoring the color palette, the text-to-color-palette retrieval system 106 disregards the now-matched color swatch (which had been an unmatched swatch in a previous iteration).

Furthermore, as shown in FIG. 1, the system 100 includes the client device 110. In some embodiments, the client device 110 includes, but is not limited to, a mobile device (e.g., smartphone, tablet), a laptop computer, a desktop computer, or any other type of computing device, including those explained below in reference to FIG. 13. Although not shown in FIG. 1, some embodiments of client device 110 are operated by a user to perform a variety of functions via a graphics processing application 112 on client device 110. For example, the client device 110 (through the graphics processing application 112 and a text-to-color-palette retrieval application 114) performs functions such as, but not limited to, searching for, requesting, receiving, and/or generating lists of color palettes relevant to a search query. In addition, in some embodiments, the client device 110 also receives color palettes from the text-to-color-palette retrieval system 106.

To access the functionalities of the text-to-color-palette retrieval system 106 (as described above and in greater detail below), in one or more embodiments, a user interacts with the graphics processing application 112 on the client device 110. For example, the graphics processing application 112 includes one or more software applications (e.g., to interact with and/or modify digital images or digital design documents in accordance with one or more embodiments described herein) installed on the client device 110, such as the text-to-color-palette retrieval application 114. In certain instances, the graphics processing application 112 and/or the text-to-color-palette retrieval application 114 is hosted on the server device(s) 102. Additionally, when hosted on the server device(s) 102, the graphics processing application 112 and/or the text-to-color-palette retrieval application 114 is accessed by the client device 110 through a web browser and/or another online interfacing platform and/or tool.

Although FIG. 1 illustrates the text-to-color-palette retrieval system 106 being implemented by a particular component and/or device within the system 100 (e.g., the server device(s) 102), in some embodiments the text-to-color-palette retrieval system 106 is implemented, in whole or in part, by other computing devices and/or components in the system 100. For instance, in some embodiments, the text-to-color-palette retrieval system 106 is implemented on the client device 110 within the text-to-color-palette retrieval application 114. More specifically, in one or more embodiments, the description of (and acts performed by) the text-to-color-palette retrieval system 106 are implemented by (or performed by) the text-to-color-palette retrieval application 114 on the client device 110. In particular, in some embodiments, the client device 110 (via an implementation of the text-to-color-palette retrieval application 114) converts textual color palette search queries to color distributions utilizing the text-to-color model 118 and scores color palettes utilizing the palette scoring model 120.

In some embodiments, the text-to-color-palette retrieval application 114 includes a web hosting application that allows the client device 110 to interact with content and services hosted on the server device(s) 102. To illustrate, in one or more implementations, the client device 110 accesses a web page or computing application supported by the server device(s) 102. The client device 110 provides input to the server device(s) 102 (e.g., a text search query). In response, the text-to-color-palette retrieval system 106 on the server device(s) 102 performs operations described herein to retrieve color palettes relevant to the text search query. The server device(s) 102 provides the output or results of the operations (e.g., one or more color palettes) to the client device 110.

As further shown in FIG. 1, the system 100 includes the color database 116. In one or more embodiments, the color database 116 includes, but is not limited to, a server device, a cloud service computing device, or any other type of computing device (including those explained below with reference to FIG. 13) that stores one or more color palettes. In some embodiments, the text-to-color-palette retrieval system 106 accesses the color database 116 to retrieve one or more color palettes. For example, the text-to-color-palette retrieval system 106 utilizes color palettes from the color database 116 to generate a ranked listing of color palettes according to an intent represented by the textual color palette search query. In some instances, the text-to-color-palette retrieval system 106 performs the above-mentioned tasks upon receiving a request from the client device 110 to retrieve color palettes from the color database 116.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 13. Furthermore, although FIG. 1 illustrates the server device(s) 102, the client device 110, and the color database 116 communicating via the network 108, in certain embodiments, the various components of the system 100 communicate and/or interact via other methods (e.g., the server device(s) 102 and the client device 110 communicating directly).

Figure 2:
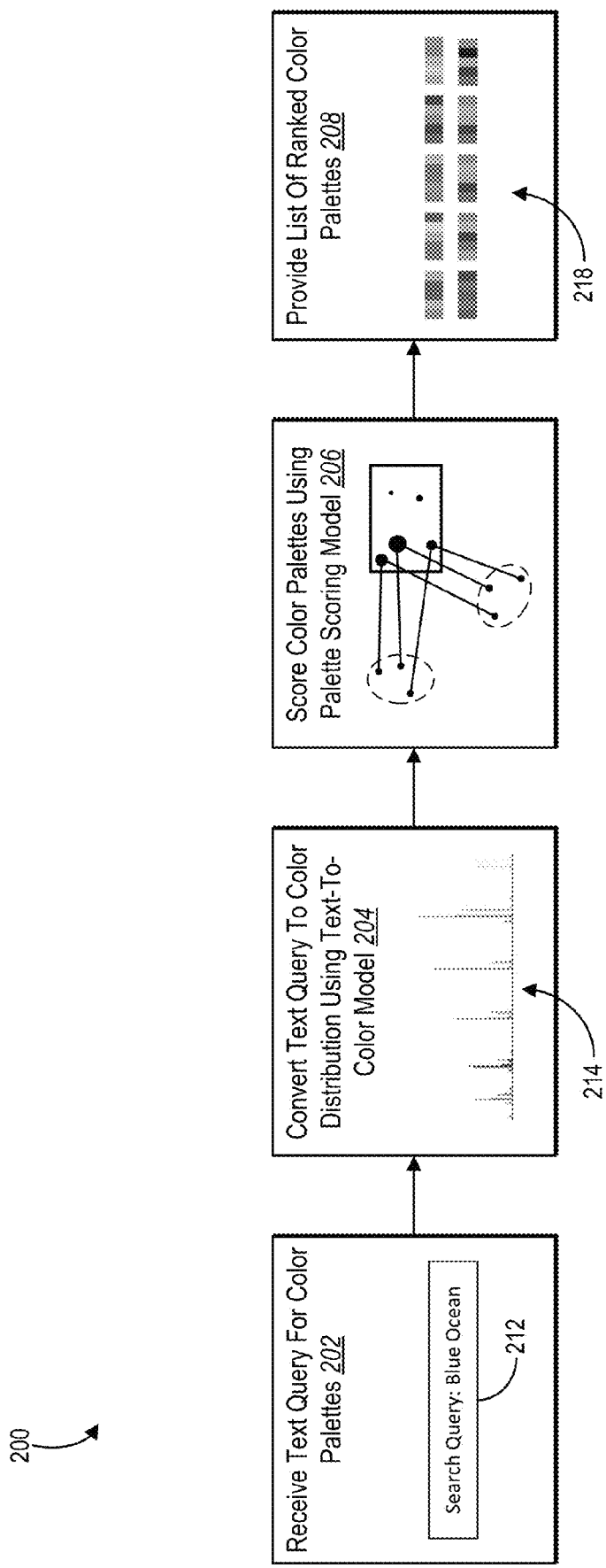
FIG. 2 illustrates an overview of a method of scoring and ranking color palettes in accordance with one or more embodiments.

As discussed above, in one or more embodiments, the text-to-color-palette retrieval system 106 provides a list of ranked color palettes. For instance, FIG. 2 illustrates the text-to-color-palette retrieval system 106 (in accordance with one or more embodiments) performing acts of a method 200 for scoring and ranking color palettes including: receiving a textual search query for color palettes 202, converting the textual search query to a color distribution using a text-to-color model 204, scoring the color palettes using a palette scoring model 206, and providing a list of ranked color palettes 208.

The text-to-color-palette retrieval system 106 receives 202 a text query for color palettes. For example, the text-to-color-palette retrieval system 106 receives an input from client device 110 comprising a textual color palette search query 212. For instance, the textual color palette search query 212 reads "blue ocean," representing a user intent to find color palettes with color swatches embodying colors of a blue ocean.

The text-to-color-palette retrieval system 106 converts 204 the textual color palette search query 212 into a color distribution 214 using the text-to-color model 118. For example, the text-to-color-palette retrieval system 106 evaluates the textual color palette search query 212 to determine a subset of color swatches in a larger set of color swatches that are most relevant to the intent represented by the textual color palette search query 212. As described in further detail below in connection with FIGS. 3A-5, the text-to-color-palette retrieval system 106 uses a color space comprising a predetermined number of color points and determines relevance scores for each color with respect to the intent of the textual color palette search query 212. The text-to-color-palette retrieval system 106 returns a color distribution 214 over the color space, with each color point weighted according to the relevance scores determined with respect to the color intent. In some embodiments, the text-to-color-palette retrieval system 106 further processes the color distribution 214. For example, in some embodiments, the text-to-color-palette retrieval system 106 truncates the color distribution 214, as further described in connection with FIG. 5.

The text-to-color-palette retrieval system 106 scores 206 color palettes using the palette scoring model 120. For instance, in some embodiments, the text-to-color-palette retrieval system 106 determines distance metrics between the color distribution 214 and each of a plurality of color palettes in the color database 116. A distance metric is a measure of how relevant a color palette or individual color swatch is to a color distribution (and thus a color intent). For example, a distance metric is a distance between a first color of a color palette and a second color of a color swatch on a color histogram. In one or more embodiments, the text-to-color-palette retrieval system 106 specifies a distance metric in HEX format. In some instances, the text-to-color-palette retrieval system 106 weights a distance metric is based on weights of color swatches, wherein the weights represent the importance or relevance of the particular color swatches to a color intent. Furthermore, in one or more embodiments, the text-to-color-palette retrieval system 106 combines distance metrics for a particular color palette to determine a score for the color palette. In one or more implementations, the text-to-color-palette retrieval system 106 determines the distance metric by determining the distance between two colors in a color space. For example, in one or more implementations, the text-to-color-palette retrieval system 106 utilizes Delta E as the distance metric.

Figure 6:
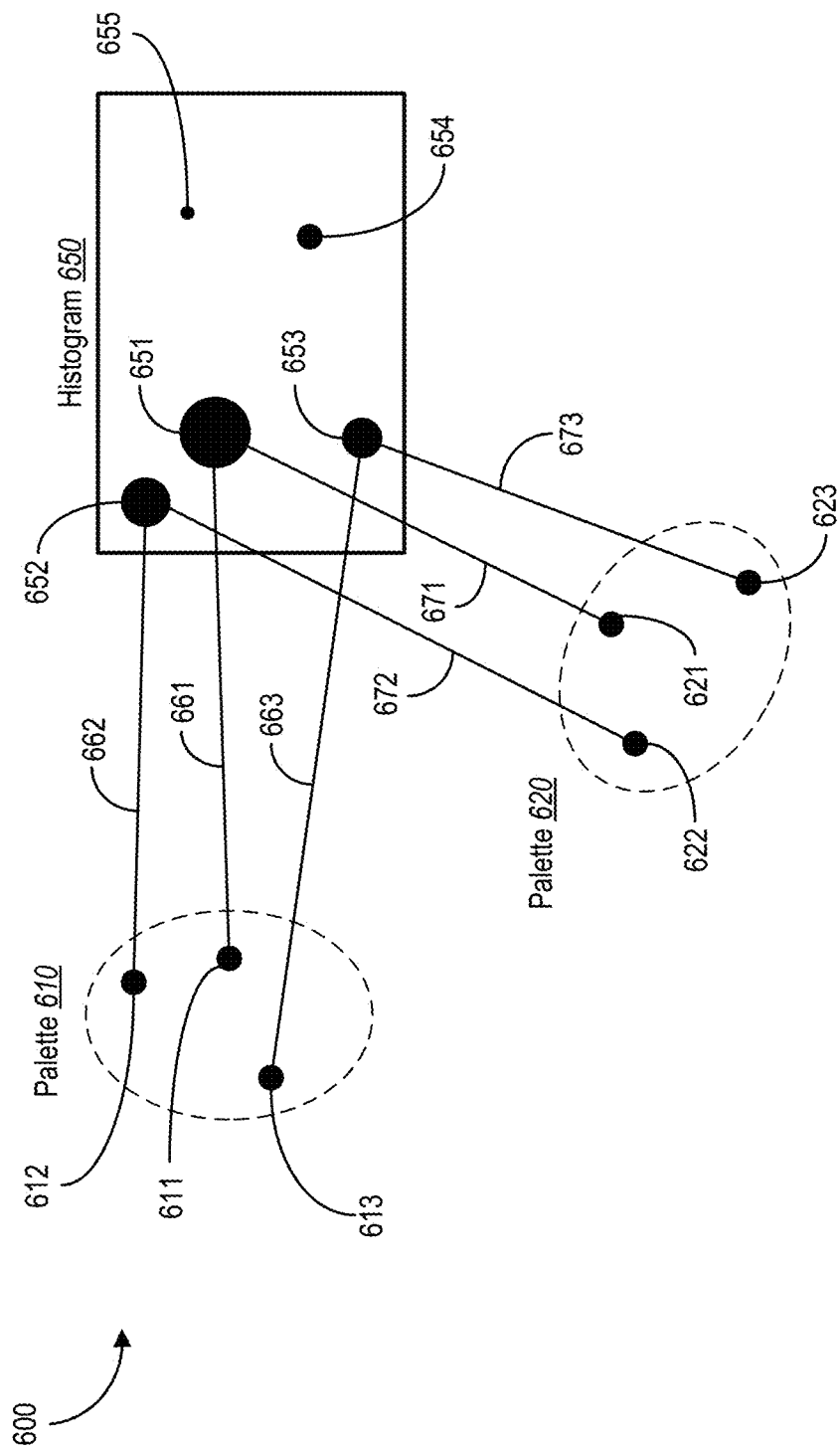
FIG. 6 illustrates an overview of utilizing a palette scoring model in accordance with one or more embodiments.

As described in further detail below in connection with FIGS. 6-7, the text-to-color-palette retrieval system 106 compares swatches of the color palettes in the plurality of color palettes with colors of the color distribution 214 and calculates numerical distances representing how close each of the swatches of the color palettes are to one or more of the colors of the color distribution 214. The text-to-color-palette retrieval system 106 aggregates the numerical distances to determine the distance metrics. For example, the text-to-color-palette retrieval system 106 sums the numerical distances for any given color palettes to determine the distance metric for that palette. In some embodiments, the text-to-color-palette retrieval system 106 utilizes a weighted summation, as described further below. The distance metric for a particular color palette represents a score for the color palette that the text-to-color-palette retrieval system 106 uses to rank the plurality of color palettes in at least one implementation.

The text-to-color-palette retrieval system 106 provides 208 a list of ranked color palettes. For instance, in some embodiments, the text-to-color-palette retrieval system 106 returns one or more color palettes 218 of the plurality of color palettes, wherein the one or more color palettes 218 are ordered based on the distance metrics for each of the color palettes in the plurality of color palettes. In this manner, the text-to-color-palette retrieval system 106 responds to the textual color palette search query 212 by providing search results that include color palettes ranked according to the intent of the search.

Figure 3A:
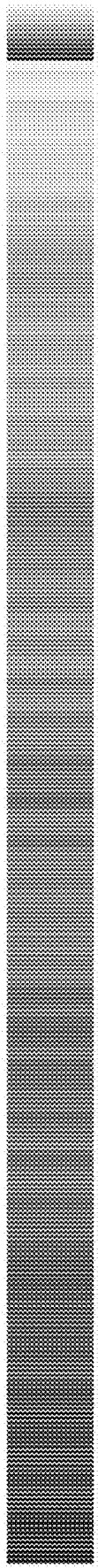
FIG. 3A illustrates a color representation as a distribution over numerous color bins in a red-green-blue color space in accordance with one or more embodiments.

The text-to-color-palette retrieval system 106 uses a color space to generate the color distribution 214. In particular, FIG. 3A shows a color space 300 having 327 predefined color points. In some embodiments, the color space 300 has more than 327 color points. In some other embodiments, the color space 300 has fewer than 327 color points. Each color point in the color space 300 has a unique color relative to the colors of the other color points in the color space 300. The color space 300, in one or more implementations, is based on a RYB, RGB, LAB, HSL, HSV, or another suitable color model. For example, FIG. 3A shows an RGB color space 300. In some embodiments, the colors are specified in hexadecimal (HEX) format.

Figure 3B:
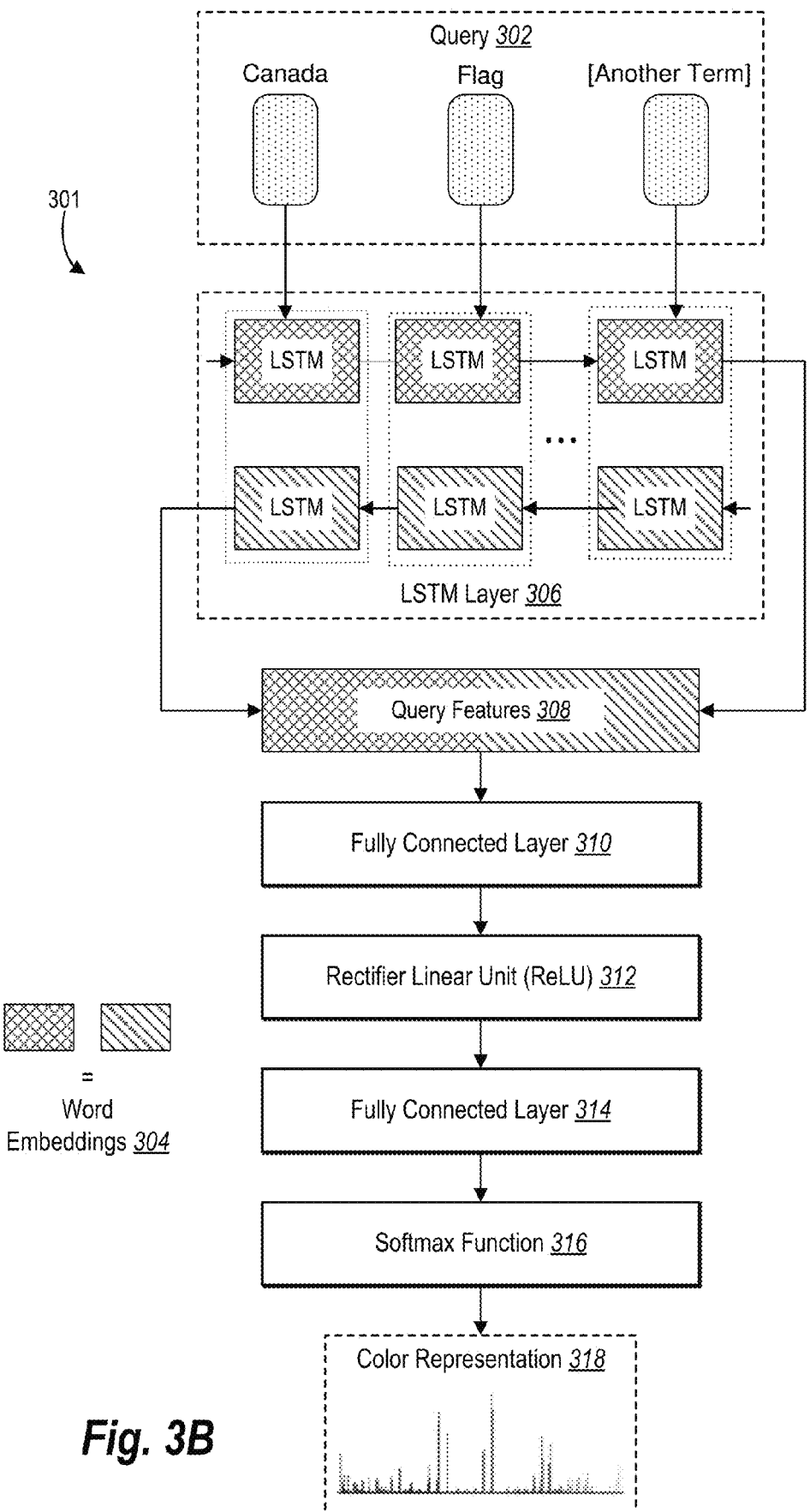
FIG. 3B illustrates a block diagram of an architecture of a query color encoder in accordance with one or more embodiments.

In one or more embodiments, the text-to-color-palette retrieval system 106 generates a color distribution 214 for a search query by converting the search query to a probability distribution over the color points in a color space 300 utilizing the text-to-color model 118. More specifically, in one or more implementations, the text-to-color-palette retrieval system 106 generates a color distribution 214 utilizing a neural-network based text-to-color model. For example, FIG. 3B is a block diagram that illustrates an architecture of a text-to-color neural network 301 (e.g., an implementation of a text-to-color model 118). In some embodiments, the text-to-color-palette retrieval system 106 utilizes the text-to-color neural network 301 to output a color representation of a query (e.g., a profile in a color space). Learning the color representations of queried terms enables the text-to-color-palette retrieval system 106 to process other queries that are mapped to a query log in a color space. To predict a color representation for a new query, the text-to-color-palette retrieval system 106 trains a neural network, such as the text-to-color neural network 301, to accept a new query as input and output a predicted color representation that represents the query.

In the illustrated example, the query 302 has text including terms such as "Canada" and "flag." To capture the context of the query 302, the text-to-color-palette retrieval system 106 uses word embeddings 304 to represent the text of the query 302. The term "word embedding" refers to the collective name for a set of language modeling and feature learning techniques in natural language processing (NLP) where words or phrases from a vocabulary are mapped to vectors of real numbers. Conceptually, word embedding involves a mathematical embedding from a space with many dimensions per word to a continuous vector space with a much lower dimension.

The text-to-color-palette retrieval system 106 passes a sequence of word embeddings 304 through a bidirectional long short-term memory (LSTM) layer 306 of the text-to-color neural network 301, which is used for the learning. The output of the LSTM layer 306 is a combination (e.g., a concatenation) of word embeddings that results in query features 308, which the text-to-color-palette retrieval system 106 passes through a fully connected network including a fully connected layer 310, a rectifier linear unit (ReLU) 312, and another fully connected layer 314. The output of the fully connected layer 314 is passed through a softmax function 316, which returns a color representation 318 as a probability distribution over color points or bins of the color model. The color representation 318 is an example of a color distribution. Thus, the text-to-color-palette retrieval system 106 uses, in one or more implementation, the color representation 318 to determine distance metrics between color palettes and the color representation 318.

A softmax function (also referred to as a normalized exponential function), is a function that takes as input a vector of K real numbers and normalizes the vector into a probability distribution consisting of K probabilities proportional to the exponentials of the input numbers. In some embodiments, the text-to-color-palette retrieval system 106 uses the softmax function 316 to determine weights for the colors of the color representation 318. For example, the text-to-color-palette retrieval system 106 uses the softmax function 316 to assign weights for the color representation 318 based on relevance of the colors of the color representation 318 to a textual color palette search query.

As explained, the text-to-color-palette retrieval system 106 utilizes a machine learning model to generate a color distribution. The text-to-color-palette retrieval system 106 trains the machine learning model utilizing an objective function to guide training. In a current context, the text-to-color-palette retrieval system 106 computes uses the objective function to compute the distance between the machine learning model's current prediction of a color representation, at a point of the training, and a desired ground-truth. The disclosed technique considers a choice of possible objective functions. For example, an objective function optionally is motivated by known behavior of user perception that is expected to guide the training of the model towards producing output that respects the available ground-truth as much as possible and predicts something similar in color.

For example, to guide training of a text-to-color model towards a desired color representation, a CIELUV color space is leveraged as an objective function in one or more implementations. CIELUV is a color space adopted by the International Commission on Illumination (CIE) in 1976, as a simple-to-compute transformation of the 1931 CIE XYZ color space, but which attempted perceptual uniformity. This space comprises of 3 channels: L for luminance and U and V together forming the chrominance channels, and distances in this space capture human perception more accurately. A color histogram (e.g., an implementation of a color representation) is represented using statistics from the chrominance and luminance channels separately and define the distance as, $$D_{LUV}(P\|Q) = D_e(L_P, L_Q)^2 \cdot D_h(N_P, N_Q)^1$$

where $D_e$ represents the Euclidean distance between the luminance features $L_P$ and $L_Q$ and $D_h$ is the Hellinger distance between the summary statistics $N_P$ and $N_Q$ for the 2D Gaussian chrominance channels of the two histograms P and Q.

Table 1 shows a comparison of model losses across training, validation, and a test set. Table 1 indicates that the learning process of the text-to-color neural network 301 is well behaved by handling over-fitting and addressing similar concerns.

TABLE 1

| Model Losses | |
|---|---|
| Training Loss | 0.015 |
| Validation Loss | 0.016 |
| Test Loss | 0.016 |
| XKCD Loss | 8.055 |

Figure 4:
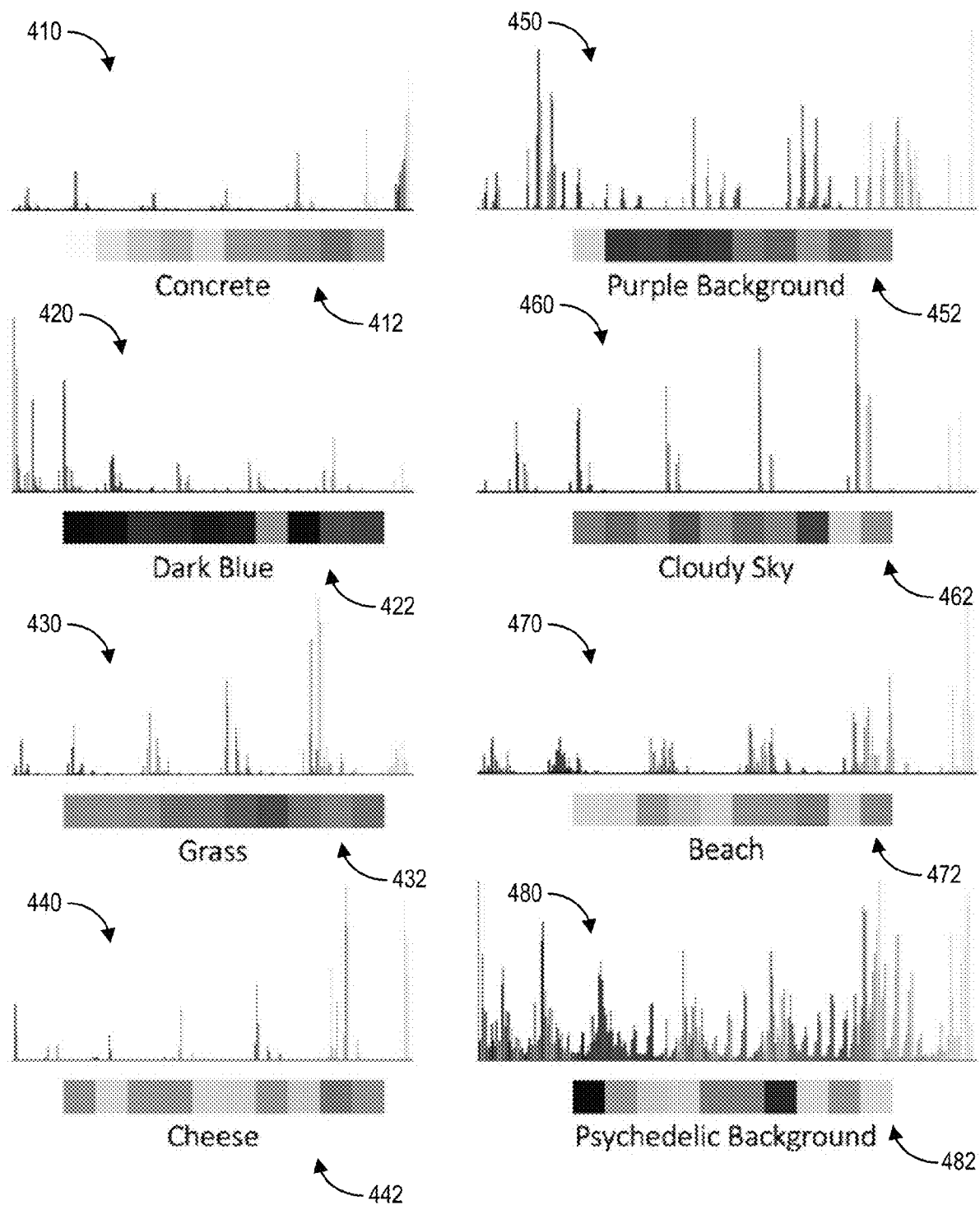
FIG. 4 illustrates results of a text-to-color model for various textual color palette search queries in accordance with one or more embodiments.

As mentioned, the text-to-color-palette retrieval system 106 converts textual color palette search queries into color distributions. For example, FIG. 4 is an illustration of several results of converting textual color palette search queries into color distributions.

The text-to-color-palette retrieval system 106 utilizes the text-to-color model 118 to generate the color distribution. In some embodiments, the text-to-color model 118 uses machine learning techniques to associate color representations with click-through behavior of users. Thus, the text-to-color model 118 trains a neural network with color representations of numerous queries in accordance with machine learning techniques by associating the color representations with click-through behavior of users. In particular, query logs of a search engine include query text strings that were input by users, corresponding search results, and historical click-through behavior of the user navigating through the search results to identify a selected image or color palette that indicates a color intent.

The click-through behavior includes any user interaction features with a set of candidate images or color palettes returned as results for a textual query. Examples of different types of user interaction features include selections and/or non-selections of candidate images or color palettes, a sequence of selections of candidate images or color palettes, a relative amount of time spent displaying a subset of candidate images or color palettes while the user scrolls through the candidate images or color palettes, a relative amount of time spent hovering a pointer over a candidate image or color palette, or any other user action to interact with a candidate image or color palette.

The different types of user interaction features have weightings of different magnitudes. As such, the machine learning model is differentially biased based on the different types of interaction features. For example, selections of candidate images or color palettes could have a weighting with a magnitude that is greater than a weighting for navigating through a sequence of the selections of the candidate images or color palettes, which could be greater than a weighting for scrolling through the candidate images or color palettes. As such, the selections of candidate images or color palettes biases the model more than the sequence of the selections, which biases the model more than scrolling through the candidate images or color palettes. Therefore, different types of user interaction features have a different impact on how the machine learning model is trained.

The trained neural network processes a new query to improve corresponding search results that are more relevant with respect to the color intent of the query. That is, by identifying the color representation of the query, the neural network is able to retrieve highly relevant color palettes that satisfy the color intent of the query and thereby improve performance of the search engine. This technique utilizes a distance factor between a current prediction of a color representation of a query and desired color representations of candidate color palettes, to rank search results based on their respective similarities to ultimately improve performance of the search engine.

In some embodiments, the text-to-color model 118 uses the query log of an existing search engine, which contains information about queries, image or color palette set results, the ranked order list of the results, and the images or color palettes that were clicked-on by users. In some instances, some or all images or color palettes available to a search engine contain the following metadata: a caption provided by each image or color palette creator, one or more tags describing content of each image or color palette, and a color representation as a probability distribution over 327 predefined points in the RGB (or other specified color model) color space.

The text-to-color model 118 leverages the query log to create color representation (e.g., color representations) for queries. A neural network model is deployed to generalize color representations of queries to train a model used to find relevant image or color palette search results for queries. A color representation for a query is defined as the average of color histograms of the clicked images or color palettes of a results set of the query.

A query color encoder outputs a color representation of a query (e.g., a profile in a color space). Learning the color representations of queried terms enables the search engine to process other queries that are mapped to a query log in a color space. To predict a color representation for a new query, the query encoder trains the neural network to accept a new query as input and output a predicted color representation that represents the query. The output predicted color representation is a color distribution that the text-to-color-palette retrieval system 106 utilizes to score color palettes with regards to the color intent of the textual search query.

In FIG. 4, color distribution 410 is a color histogram representing a color intent of the textual search query "concrete." In the color distribution 410, prominent color swatches in the color histogram are primarily gray, ranging between light gray and dark gray. This demonstrates that the text-to-color-palette retrieval system 106 accurately finds colors in the color space 300 that represent the color intent of the textual search query "concrete," as a person of skill in the art having the benefit of this disclosure would recognize that, out of the range of all colors, light gray and dark gray colors are most representative of concrete. A color palette 412 shows colors of the ten tallest color swatches of the color distribution 410. In some embodiments of the text-to-color-palette retrieval system 106, determining distance metrics between the color distribution 410 and each of a plurality of color palettes in the color database 116 includes determining distance metrics between the color palette 412 and each of the plurality of color palettes in the color database 116. By utilizing the color palette 412, the text-tocolor-palette retrieval system 106 reduces storage size requirements in storage media and improves computational performance by reducing the number of colors against which to compare individual color palettes of the plurality of color palettes. In some embodiments, the number of swatches in the color palette 412 is less than ten. In some other embodiments, the number of swatches in the color palette 412 is more than ten.

Color distribution 420 is a color histogram representing a color intent of the textual search query "dark blue." In the color distribution 420, prominent color swatches in the color histogram are primarily blue, ranging between very dark blue (nearly black) and moderately dark blue (such as navy blue). Similar to the color distribution 410, the color distribution 420 has a corresponding color palette 422 that shows colors of a number of the tallest color swatches of the color distribution 420. The text-to-color-palette retrieval system 106 uses the color palette 422 in determining distance metrics in similar fashion to that described above for the color palette 412.

Similarly, the text-to-color-palette retrieval system 106 converts any textual color palette search query into a color distribution. For example, color distribution 430 is a color histogram representing a color intent of the textual search query "grass," in which prominent color swatches are various shades of green. Color distribution 440 is a color histogram representing a color intent of the textual search query "cheese," in which prominent color swatches are various shades of orange, tan, yellow, brown, or gray. Color distribution 450 is a color histogram representing a color intent of the textual search query "purple background," in which prominent color swatches are various shades of purple, including shades close to pink, blue, or magenta. Color distribution 460 is a color histogram representing a color intent of the textual search query "cloudy sky," in which prominent color swatches are various shades of blue, teal, or gray. Color distribution 470 is a color histogram representing a color intent of the textual search query "beach," in which prominent color swatches include tan, yellow, orange, teal, blue, and gray. Color distribution 480 is a color histogram representing a color intent of the textual search query "psychedelic background," in which prominent color swatches include black, tan, yellow, blue, and purple.

In similar fashion to color distributions 410 and 420, color distributions 430, 440, 450, 460, 470, and 480 each have respective color palettes 432, 442, 452, 462, 472, and 482. The text-to-color-palette retrieval system 106 utilizes color palettes 432, 442, 452, 462, 472, and 482 for their respective textual search queries to efficiently determine distance metrics for individual color palettes in the plurality of color palettes.

Figure 5:
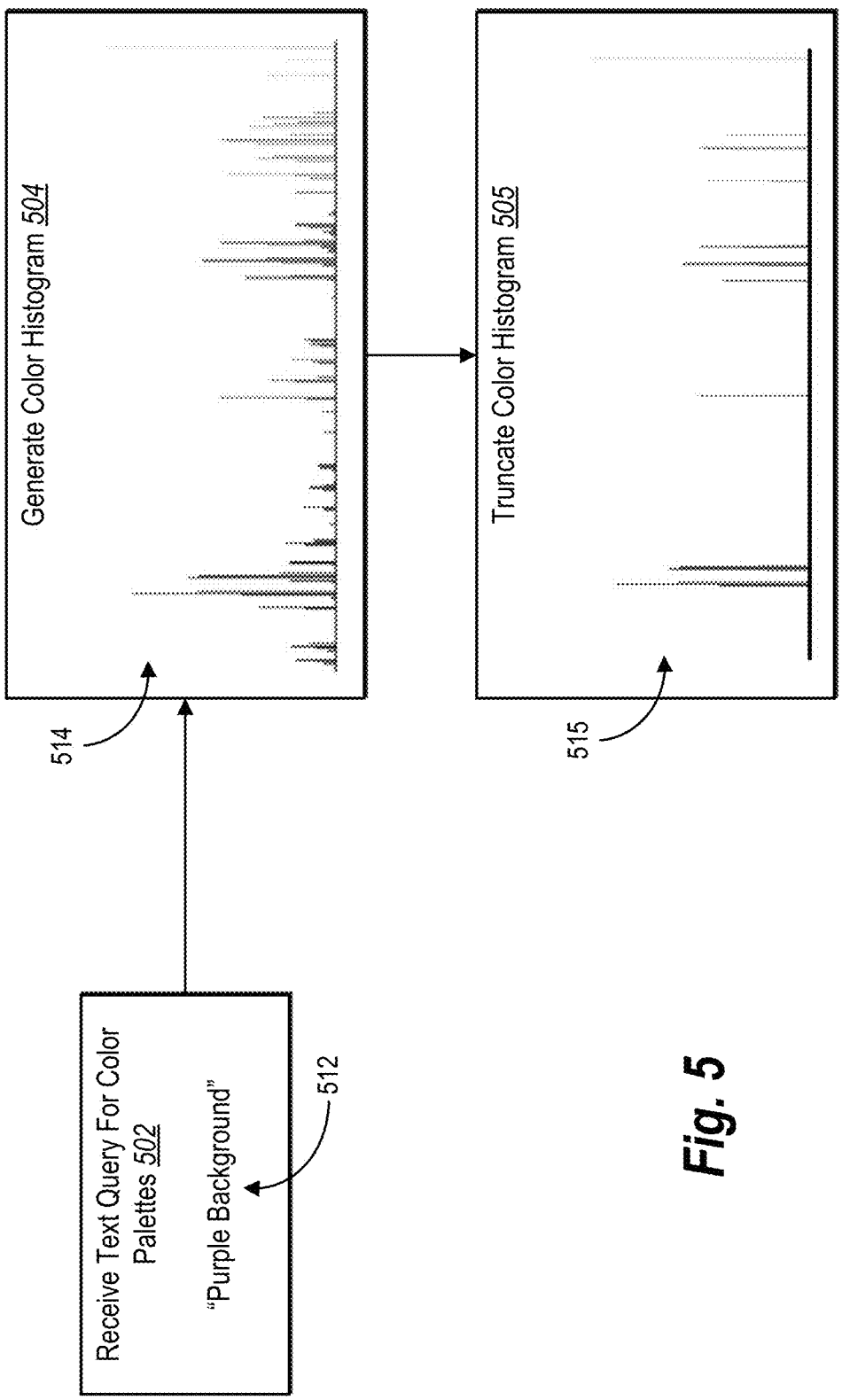
FIG. 5 illustrates truncating a color distribution in accordance with one or more embodiments.

As discussed above, the text-to-color-palette retrieval system 106 truncates the color distribution in one or more implementations. For instance, FIG. 5 illustrates the text-to-color-palette retrieval system 106 generating and truncating a color histogram in accordance with one or more embodiments. Specifically, FIG. 5 shows the text-to-color-palette retrieval system 106 receiving 502 a textual color palette search query (e.g., text query "purple background" 512), generating 504 a color distribution 514, and truncating 505 the color distribution 514 to generate a truncated color distribution 515. The text-to-color-palette retrieval system 106 performs the act 504 of generating a color histogram (such as color distribution 514) according to the description above in connection with FIGS. 2-4.

In some embodiments, the text-to-color-palette retrieval system 106 reduces the size of the color histogram (such as color distribution 514). For example, the text-to-color-palette retrieval system 106 removes colors from the color histogram that have low relevance to the text query 512. In some embodiments, this act 505 of truncating the color histogram includes determining a threshold probability of relevance of the colors to the query. For instance, the text-to-color-palette retrieval system 106 removes color from the color histogram that have a probability of relevance to the textual search query less than a threshold value, while the text-to-color-palette retrieval system 106 retains colors in the color histogram that have a probability of relevance to the textual search query equal to or greater than the threshold value. In some embodiments, the truncation act 505 includes determining a number of colors to retain in the color histogram. For instance, the text-to-color-palette retrieval system 106 removes from the color histogram all colors with probabilities of relevance to the textual search query lower than the top ten colors, while retaining in the color histogram the ten colors with the highest probability values. In some embodiments, the text-to-color-palette retrieval system 106 uses a combination of a threshold probability value and a number of total colors to determine which colors to retain. In this manner, the text-to-color-palette retrieval system 106 generates a truncated color histogram that has fewer colors than the color histogram. Thus, the text-to-color-palette retrieval system 106 improves functionality of the server device(s) 102 and/or the client device 110 by reducing the storage media size required to determine distance metrics for scoring color palettes, and by increasing processing efficiency of the server device(s) 102 and/or the client device 110.

As discussed above, the text-to-color-palette retrieval system 106 scores color palettes using a palette scoring model in one or more implementations. For instance, FIG. 6 illustrates the text-to-color-palette retrieval system 106 utilizing a palette scoring model 600 to determine distance metrics between a color distribution and each of a plurality of color palettes in a color database in accordance with one or more embodiments. Specifically, FIG. 6 shows the text-to-color-palette retrieval system 106 utilizing the palette scoring model 600 to determine distance metrics between a color histogram 650 and a first color palette 610, as well as between the color histogram 650 and a second color palette 620.

In some embodiments, the text-to-color-palette retrieval system 106 utilizes the palette scoring model 600 to assign swatch matches by matching swatches in any given color palette with colors in the color distribution. For example, the text-to-color-palette retrieval system 106 utilizes the palette scoring model 600 to order the colors of the color histogram 650 (or truncated color histogram) in order of their probabilities of relevance to the textual search query. The text-to-color-palette retrieval system 106 utilizes the palette scoring model 600 to assign a match with the color with the highest-probability of relevance. In FIG. 6, the ordering of the colors in the color histogram 650 is represented by the sizes of dots in the color histogram 650. Thus, color 651 in the color histogram 650 is the color with the highest probability of relevance to the textual search query.

In assigning matches between the color histogram 650 and the first palette 610, the text-to-color-palette retrieval system 106 matches color 651 with a swatch 611 of the color palette 610 that is closest to color 651. Then, in successive fashion, the text-to-color-palette retrieval system 106 utilizes the palette scoring model 600 to match the next highest-probability color of the color histogram 650 (e.g., color 652) with a swatch 612 of the color palette 610 that is next closest to color 652 (not counting swatch 611, which is already matched with a color of the color histogram 650). Continuing in like manner, the text-to-color-palette retrieval system 106 utilizes the palette scoring model 600 to match the next-highest-probability color of the color histogram 650 (e.g., color 653) with a swatch 613 of the color palette 610 that is next closest to color 653 (after swatch 611 and swatch 612, which have already been matched with respective colors in the color histogram 650). For additional swatches in the first color palette 610, the text-to-color-palette retrieval system 106 utilizes the palette scoring model 600 to assign swatch matches respectively with the successively highest-probability colors of the color histogram 650. That is, for example, if there are a fourth swatch and a fifth swatch of the first color palette 610, the palette scoring model 600 assigns them into swatch matches with colors 654 and 655 of the color histogram, with color 654 (having a higher probability than color 655) being matched with the swatch of the first color palette 610 that is closest in distance (not including already-assigned swatches 611, 612, 613).

For each swatch match between swatches of the first color palette 610 with corresponding colors of the color histogram 650, the text-to-color-palette retrieval system 106 utilizes the palette scoring model 600 to determine distance metrics to represent how close the respective swatches of the first color palette 610 are to the colors of the color histogram 650. For example, if the colors are specified in HEX format, the text-to-color-palette retrieval system 106 utilizes the palette scoring model 600 to compute a distance between a respective swatch and color within the swatch match. For each swatch match, the palette scoring model 600 stores the computed distance for further processing, such as weighting and summing. To illustrate, the text-to-color-palette retrieval system 106 utilizes the palette scoring model 600 to determine a distance 661 between color 651 of the color histogram 650 and swatch 611 of the first color palette 610. The text-to-color-palette retrieval system 106 also utilizes the palette scoring model 600 to determine a distance 662 between color 652 of the color histogram 650 and swatch 612 of the first color palette 610. Furthermore, the text-to-color-palette retrieval system 106 utilizes the palette scoring model 600 to determine a distance 663 between color 653 of the color histogram 650 and swatch 613 of the first color palette 610.

As discussed further below, the text-to-color-palette retrieval system 106 utilizes the palette scoring model 600 to optionally weight each of the distances 661, 662, 663. Furthermore, the text-to-color-palette retrieval system 106 utilizes the palette scoring model 600 to and sum the distances 661, 662, 663 (weighted or not) to determine a score for the first color palette 610. As the distances 661, 662, 663 represent how close the swatches of the first color palette 610 are to the respective colors of the color histogram 650, a smaller distance represents a closer match. Thus, a sum (weighted or not) of the distances 661, 662, 663 that has a low magnitude indicates that the first color palette closely matches the color representation of the color histogram 650, and therefore, closely matches the color intent represented by the textual color palette search query.

In like manner, the text-to-color-palette retrieval system 106 utilizes the palette scoring model 600 to determine distance metrics between the second color palette 620 and the color histogram 650. For example, the text-to-color-palette retrieval system 106 utilizes the palette scoring model 600 to assign swatch matches between the second color palette 620 and the color histogram 650. The text-to-color-palette retrieval system 106 utilizes the palette scoring model 600 to match the highest-probability color 651 of color histogram 650 with the swatch 621 of the second color palette 620 that is closest to color 651. The text-to-color-palette retrieval system 106 utilizes the palette scoring model 600 to match the second-highest-probability color 652 of color histogram 650 with the next closest swatch 622 of the second color palette 620 (that is, the closest swatch of the second color palette 620 not counting the swatch 621 that is already assigned in a swatch match). The text-to-color-palette retrieval system 106 utilizes the palette scoring model 600 to match the third-highest probability color 653 of the color histogram 650 with the next closest swatch 623 of the second color palette 620 (again, not counting the swatch 621 or the swatch 622, as they are already assigned in swatch matches). For additional swatches in the second color palette 620, the text-to-color-palette retrieval system 106 utilizes the palette scoring model 600 to assign swatch matches respectively with the successively highest-probability swatches of the color histogram 650. That is, for example, if there are a fourth swatch and a fifth swatch of the second color palette 620, the text-to-color-palette retrieval system 106 utilizes the palette scoring model 600 to assign them into swatch matches with colors 654 and 655 of the color histogram, with color 654 (having a higher probability than color 655) being matched with the swatch of the second color palette 620 that is closest in distance (not including already-assigned swatches 621, 622, 623). The text-to-color-palette retrieval system 106 utilizes the palette scoring model 600 generate a score for the second color palette 620 in like manner to that generated for the first color palette 610.

Figure 7:
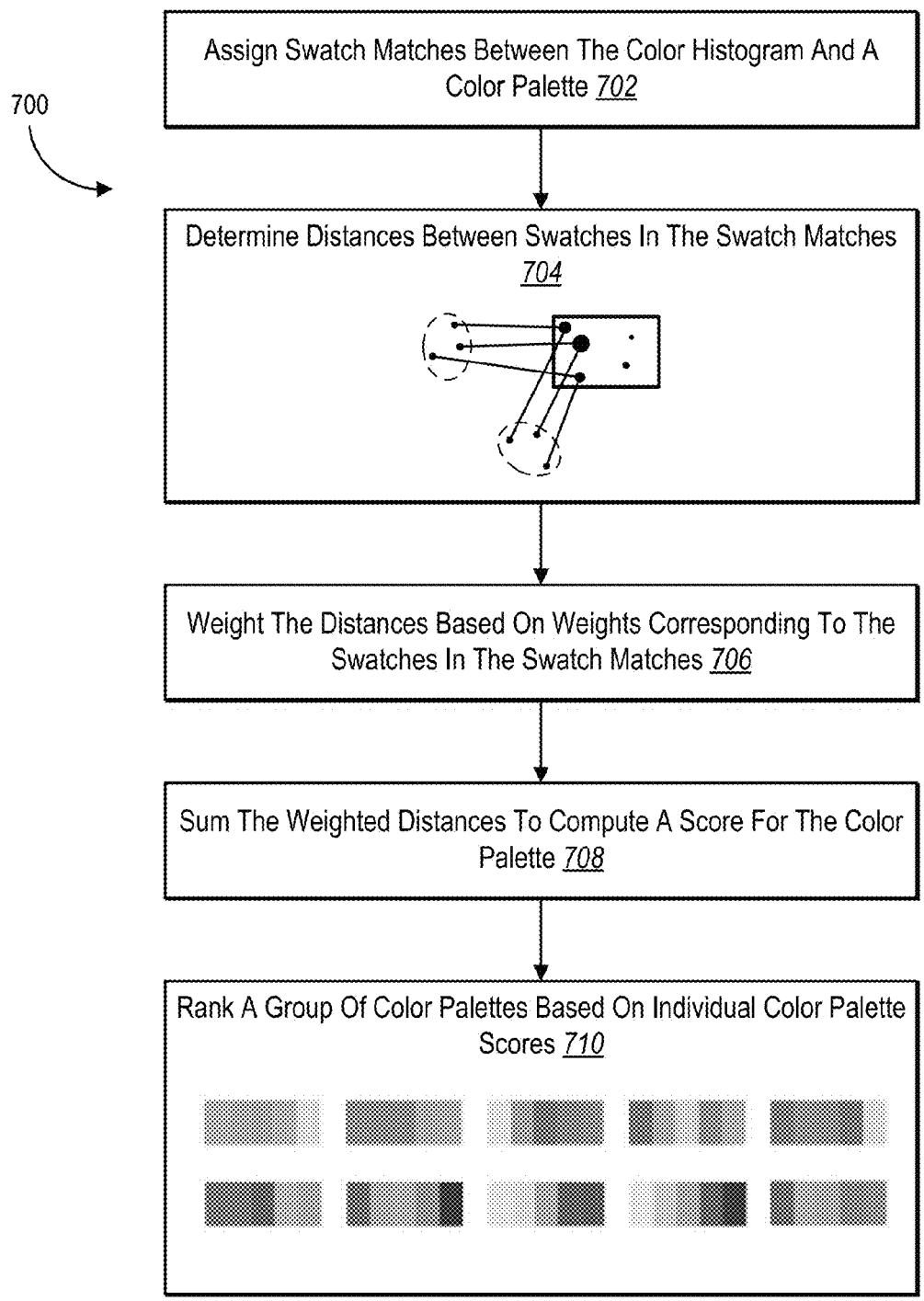
FIG. 7 illustrates an overview of a method of scoring and ranking color palettes in accordance with one or more embodiments.

To continue the discussion of determining distance metrics between the color distribution and each of a plurality of color palettes in a color database, FIG. 7 illustrates acts for scoring a color palette using the palette scoring model 600. Specifically, FIG. 7 shows the text-to-color-palette retrieval system 106 performing a method 700 for scoring a color palette including the acts of assigning 702 swatch matches between a color histogram and a color palette, determining 704 distances between swatches in the swatch matches, weighting 706 the distances based on weights corresponding to the swatches in the swatch matches, summing 708 the weighted distances to compute a score for the color palette, and ranking 710 a group of color palettes based on individual color palette scores.

In act 702, the text-to-color-palette retrieval system 106 assigns swatch matches between a color distribution (such as the color histogram 650) and a color palette (such as the first color palette 610). In some embodiments, the text-to-color-palette retrieval system 106 matches each color swatch of the color palette respectively to the closest color swatch of the color distribution, irrespective of the relevance probabilities of the swatches of the color distribution. In some other embodiments, including the preferred embodiment, and as described above in connection with FIG. 6, the text-to-color-palette retrieval system 106 matches the highest-probability color swatches of the color distribution with the closest color swatch of the color palette, in successive order disregarding swatches of the color palette that already have been assigned a swatch match.

In act 704, the text-to-color-palette retrieval system 106 determines distances between colors and swatches of the assigned swatch matches. As explained above in connection with FIG. 6, the text-to-color-palette retrieval system 106 computes a distance for each swatch match. For instance, a computed distance is the difference in HEX format between a swatch of the color palette and a color of a swatch of the color distribution. The distance represents the relative closeness between the two colors in the swatch match.

In act 706, the text-to-color-palette retrieval system 106 weights each of the distances between swatches of the assigned swatch matches, wherein the weights correspond to the swatches in the swatch match. For example, the swatches in the color distribution each have weights corresponding to their respective probability values representing how relevant the swatch is to the color intent represented by the textual color palette search query.

In contrast, if the text-to-color-palette retrieval system 106 has no prior information about the relevance of individual swatches in the color palette, the swatches in the color palette may be equally weighted. The weights of the individual swatches in a color palette sum to unity. For instance, in a five-swatch color palette, each swatch may have a weight of one-fifth (0.2).

To weight the distance of each of the swatch matches, the text-to-color-palette retrieval system 106 divides the distance by the product of both weights. Stated differently, the weighted distance for any given swatch match is the distance for the swatch match divided by the weight of the swatch of the color palette, and then divided by the weight of the swatch of the color distribution. In this manner, swatches with relatively large weights have a greater impact on the distance, resulting in a relatively smaller weighted distance, while swatches with relatively small weights work to make the weighted distance relatively large.

In act 708, the text-to-color-palette retrieval system 106 sums the weighted distances to compute a score for the color palette. In alternative embodiments, the text-to-color-palette retrieval system 106 skips act 706, and act 708 includes summing the unweighted distances to compute a score for the color palette.

In act 710, the text-to-color-palette retrieval system 106 ranks a group of color palettes (e.g., all palettes in the color database 116) based on individual color palette scores. For example, the text-to-color-palette retrieval system 106 orders the color palettes in a plurality of color palettes (i.e., the group of color palettes) from smallest score to largest score. The smallest score belongs to the color palette that has a color representation closest to the color distribution, and therefore the color palette that is most relevant to the color intent represented by the textual color palette search query.

The text-to-color-palette retrieval system 106 scores a color palette utilizing an algorithm of the palette scoring model 120. In particular, in the algorithm, $p_i=\{p_{i1}, p_{i2}, \ldots, pix\}$, where $p_i$ is the ith color palette in a group of color palettes and $p_{ik}$ is the kth color swatch in the color palette $p_i$. The color palette $p_i$ has corresponding data, including $p_{ik}$.HEX, which specifies the point in color space corresponding to the color swatch $p_{ik}$, and $p_{ik}$.WEIGHT, which specifies the relative significance (weight) of the color swatch $p_{ik}$ to the color palette $p_i$. The weights of the various color swatches are greater than zero, and the sum of the weights of all swatches in a palette equals unity. (That is, $p_{ik}$.WEIGHT>0 and $\Sigma_k p_{ik}$.WEIGHT=1.)

The number of swatches in the color palette $p_i$ is represented as $|p_i|$. In some embodiments, the number of swatches in each color palettes is five ($|p_i|=5$). In some embodiments, the number of swatches in a first color palette is different from the number of swatches in a second color palette in the group of color palettes.

The color distribution generated by the text-to-color model 118 (e.g., the color histogram) is represented as $p_q$. The number of swatches in the color distribution is $|p_q|$. In some embodiments, this number is $|p_q|=327$.

The algorithm for scoring a color palette (the ith color palette) can be represented as follows:

$C=\{\ \}$ $s_i=0$

For $b=1:B$ $x = \underset{k=1:|p_i|;k \notin C}{\operatorname{argmin}} D(p_{qb} \cdot \text{HEX}, p_{ik} \cdot \text{HEX})$ $s_i \mathrel{+}= \dfrac{D(p_{qb} \cdot \text{HEX}, p_{ik} \cdot \text{HEX})}{p_{qb} \cdot \text{WEIGHT} * p_{ix} \cdot \text{WEIGHT}}$ $C=\text{Union}(C,x)$ return $s_i$ where C is the set of swatches in a given palette than have been assigned to a swatch match, B is the number of top-weighted swatches in the color distribution to consider for scoring ($B \leq |p_q|$), and $s_i$ is the score of the ith palette. D is the distance between a swatch of a color palette and a swatch of the color distribution.

In some embodiments, B is set to a small value (e.g., B=10) so that the text-to-color-palette retrieval system 106 considers only the colors most relevant to the textual search query. This is one way of achieving the truncation of the color distribution described above.

By placing the swatch x into the set C as shown in the algorithm above, the text-to-color-palette retrieval system 106 removes swatch x from consideration in further iterations. Thus, in some embodiments, the text-to-color-palette retrieval system 106 considers only unmatched swatches of the ith color palette to pair with remaining swatches of the color distribution. In this way, the text-to-color-palette retrieval system 106 prioritizes color palettes with multiple swatches relevant to the color intent of the textual search query. This gives the advantage that the colors of the top-ranked color palettes in the search results are most aligned with the color intent of the search query.

In some embodiments, the text-to-color-palette retrieval system 106 evaluates whether the number of results returned in the ranked list of color palettes is smaller than desired. In other words, the text-to-color-palette retrieval system 106 considers whether the number of color palettes relevant to the color intent of the textual search query is less than a desirable amount. If the number of high-quality search results is too small, the text-to-color-palette retrieval system 106 leverages the color distribution a second time (after utilizing the color distribution to determine the distance metrics and scores for the plurality of color palettes) to generate new color palettes. For example, the text-to-color-palette retrieval system 106 extracts colors from the color distribution to generate color swatches and group them into color palettes. In some embodiment, the text-to-color-palette retrieval system 106 utilizes K-means clustering or RGB convex hull simplification to generate new color palettes. The text-to-color-palette retrieval system 106 combines these newly generated color palettes with the short list of high-quality search results. For instance, the text-to-color-palette retrieval system 106 first lists the high-quality search results (the color palettes with low scores from the initial scoring process), and lists the newly generated color palettes to augment the list of search results.

In some embodiments, the text-to-color-palette retrieval system 106 incorporates static qualities of a color theme into the palette scoring model. For example, the text-to-color-palette retrieval system 106 prioritizes color palettes that have a high degree of color harmony or uniformity amongst the individual color swatches in the color palette. This prioritization is independent of the textual color palette search query. Thus, for instance, the text-to-color-palette retrieval system 106 ranks higher those color palettes with a higher degree of uniformity across the color swatches than color palettes with high variability across the color swatches.

As discussed above, the text-to-color-palette retrieval system 106 returns superior color palette search results over conventional systems, as illustrated by contrasting search results provided in FIGS. 8A and 8B. For instance, FIG. 8A shows search results from a conventional system for the search query "autumn," while FIG. 8B shows search results from the text-to-color-palette retrieval system 106 for the search query "autumn."

As can be appreciated, the color palette search results returned by the text-to-color-palette retrieval system 106 shown in FIG. 8B better represent a color intent behind the search query "autumn" than the color palette search results returned by the conventional system shown in FIG. 8A. For example, as shown in FIG. 8A, the first color palette 801 listed in the search results of the conventional system has the following color swatches: a yellow shade in swatch 801a, a peach shade in swatch 801b, a blue-gray shade in swatch 801c, a maroon shade in swatch 801d, and a green shade in swatch 801e. Continuing through the search results of the conventional system, the second color palette 802 has the following color swatches: a dark brown shade in swatch 802a, a dark green shade in swatch 802b, a light green shade in swatch 802c, a light brown shade in swatch 802d, and a tan shade in swatch 802e.

In contrast, as shown in FIG. 8B, the first color palette 851 listed in the search results of the text-to-color-palette retrieval system 106 has the following color swatches: an orange-gold shade in swatch 851a, a gold shade in swatch 851b, an orange shade in swatch 851c, a brown shade in swatch 851d, and a yellow shade in swatch 851e. Continuing through the search results of the text-to-color-palette retrieval system 106, the second color palette 852 has the following color swatches: a brown shade in swatch 852a, an orange-pink shade in swatch 852b, an orange-brown shade in swatch 852c, a yellow-gold shade in swatch 852d, and a yellow-green shade in swatch 852e.

Comparing the color palettes returned by the text-to-color-palette retrieval system 106 against the color palettes returned by the conventional system for the search query "autumn," one can appreciate that the text-to-color-palette retrieval system 106 generates search results that better match the color intent behind the search query. For example, the color swatches noted above in connection with FIG. 8B (the text-to-color-palette retrieval system 106 results for "autumn") include shades of orange, gold, brown, and yellow, which are colors traditionally thought of as autumn colors. In contrast, the color swatches noted above in connection with FIG. 8A (the conventional system results for "autumn") include yellow, peach, blue-gray, maroon, green, brown, and tan. While some of these colors include traditional autumn colors, these results also include colors that typically are not thought of as autumn colors. Therefore, the text-to-color-palette retrieval system 106 delivers better search results for the "autumn" textual search query than the conventional system.

Figure 9A:
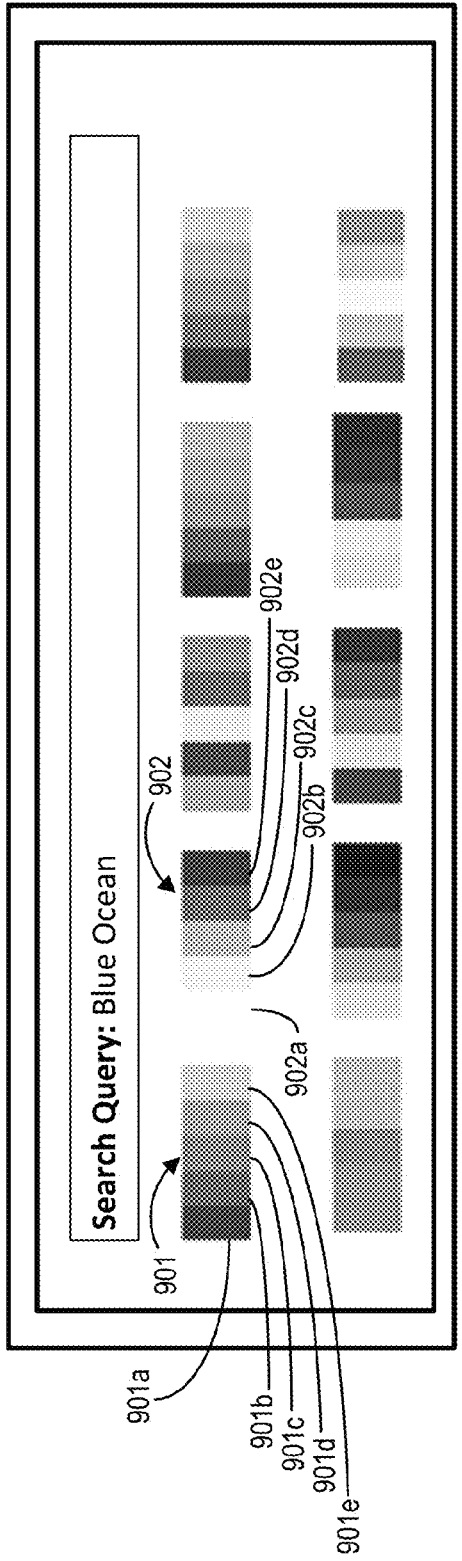
FIGS. 9A and 9B illustrate results for a textual color palette search query "blue ocean" generated by a conventional system and the text-to-color-palette retrieval system, respectively, in accordance with one or more embodiments.
Figure 9B:
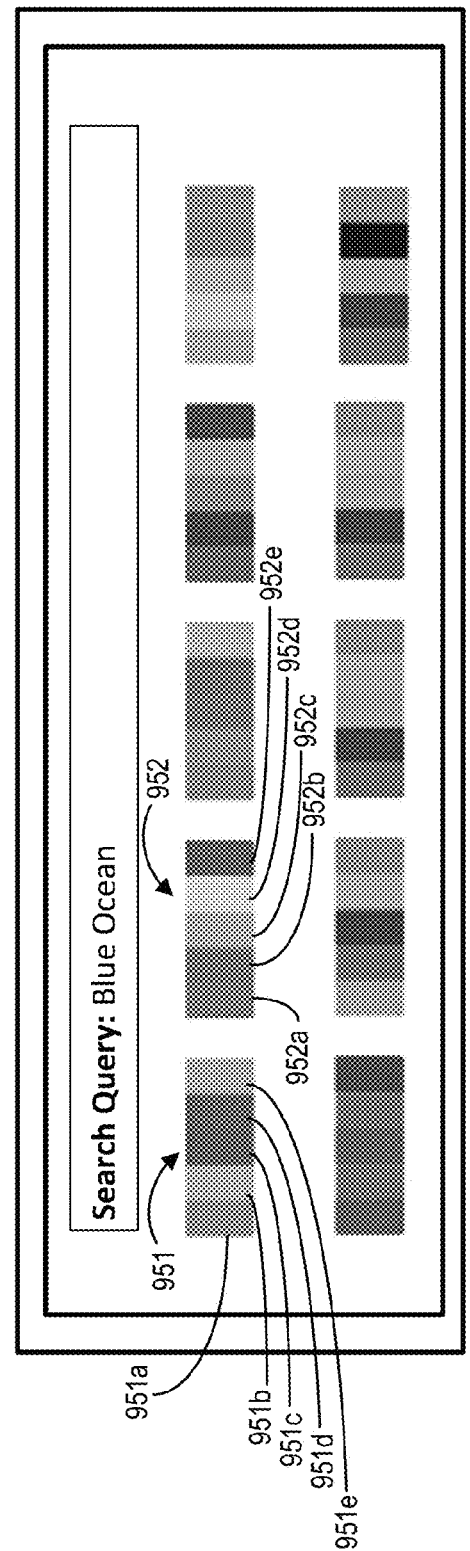

The contrast between FIG. 8B and FIG. 8A demonstrates that the text-to-color-palette retrieval system 106 returns superior color palette search results over conventional systems for textual search queries with implicit color intent (that is, "autumn" is not expressly the name of a color, but impliedly connotes color). Likewise, the contrast between FIGS. 9A and 9B show that the text-to-color-palette retrieval system 106 delivers better color palette search results over conventional systems for textual search queries with explicit color intent. FIG. 9A shows color palette search results returned by a conventional system for the search query "blue ocean." FIG. 9B shows color palette search results returned by the text-to-color-palette retrieval system 106 for the same search query, "blue ocean."

As can be appreciated, the color palette search results returned by the text-to-color-palette retrieval system 106 shown in FIG. 9B better represent a color intent behind the search query "blue ocean" than the color palette search results returned by the conventional system shown in FIG. 9A. For example, as shown in FIG. 9A, the first color palette 901 listed in the search results of the conventional system has the following color swatches: a blue-purple shade in swatch 901a, a teal shade in swatch 901b, a blue-green shade in swatch 901c, a green shade in swatch 901d, and a yellow-green shade in swatch 901e. Continuing through the search results of the conventional system, the second color palette 902 has the following color swatches: a white shade in swatch 902a, a tan shade in swatch 902b, a green-gray shade in swatch 902c, a blue shade in swatch 902d, and a dark blue shade in swatch 902e.

In contrast, as shown in FIG. 9B, the first color palette 951 listed in the search results of the text-to-color-palette retrieval system 106 has the following color swatches: a blue shade in swatch 951a, a teal shade in swatch 951b, a dark blue shade in swatch 951c, a blue-purple shade in swatch 951d, and a light blue shade in swatch 951e. Continuing through the search results of the text-to-color-palette retrieval system 106, the second color palette 952 has the following color swatches: a green-brown shade in swatch 952a, a blue shade in swatch 952b, a teal shade in swatch 952c, a blue-green shade in swatch 952d, and a dark blue-green shade in swatch 952e.

Comparing the color palettes returned by the text-to-color-palette retrieval system 106 against the color palettes returned by the conventional system for the search query "blue ocean," one can appreciate that the text-to-color-palette retrieval system 106 generates search results that better match the color intent behind the search query. For example, the color swatches noted above in connection with FIG. 9B (the text-to-color-palette retrieval system 106 results for "blue ocean") primarily include shades of blue, such as blue, teal, dark blue, blue-purple, light blue, and blue-green, which are colors traditionally thought of as blue ocean colors. In contrast, the color swatches noted above in connection with FIG. 9A (the conventional system results for "blue ocean") include blue-purple, teal, blue-green, green, yellow-green, white, tan, green-gray, and blue. While some of these colors include traditional blue ocean colors, these results also include colors that typically are not thought of as blue ocean colors (e.g., white, yellow-green, tan, and green-gray). Therefore, the text-to-color-palette retrieval system 106 delivers better search results for the "blue ocean" textual search query than the conventional system.

Figure 10A:
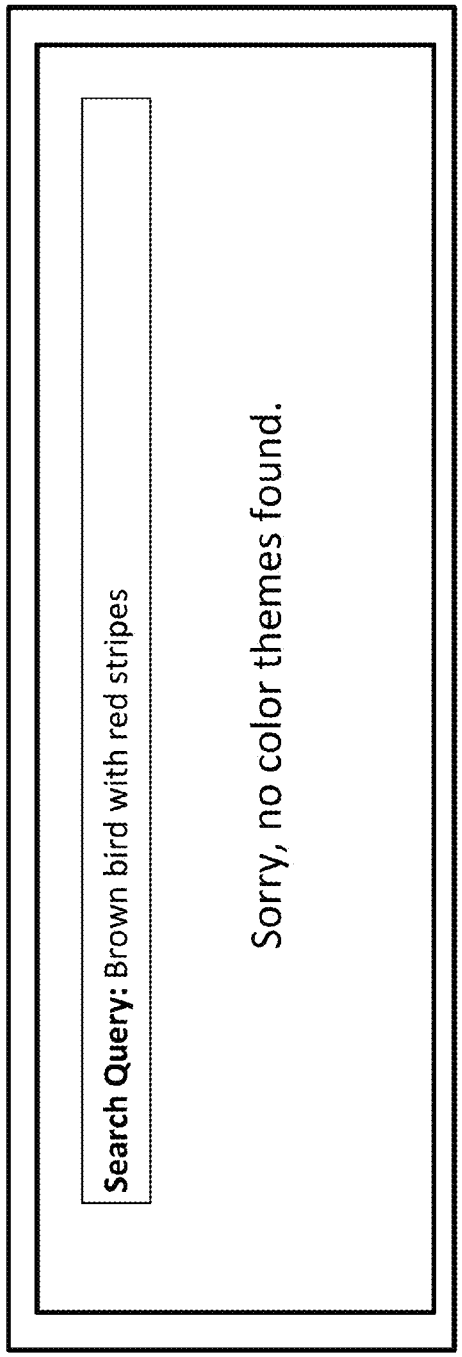
FIGS. 10A and 10B illustrate results for a textual color palette search query "brown bird with red stripes" generated by a conventional system and the text-to-color-palette retrieval system, respectively, in accordance with one or more embodiments.
Figure 10B:
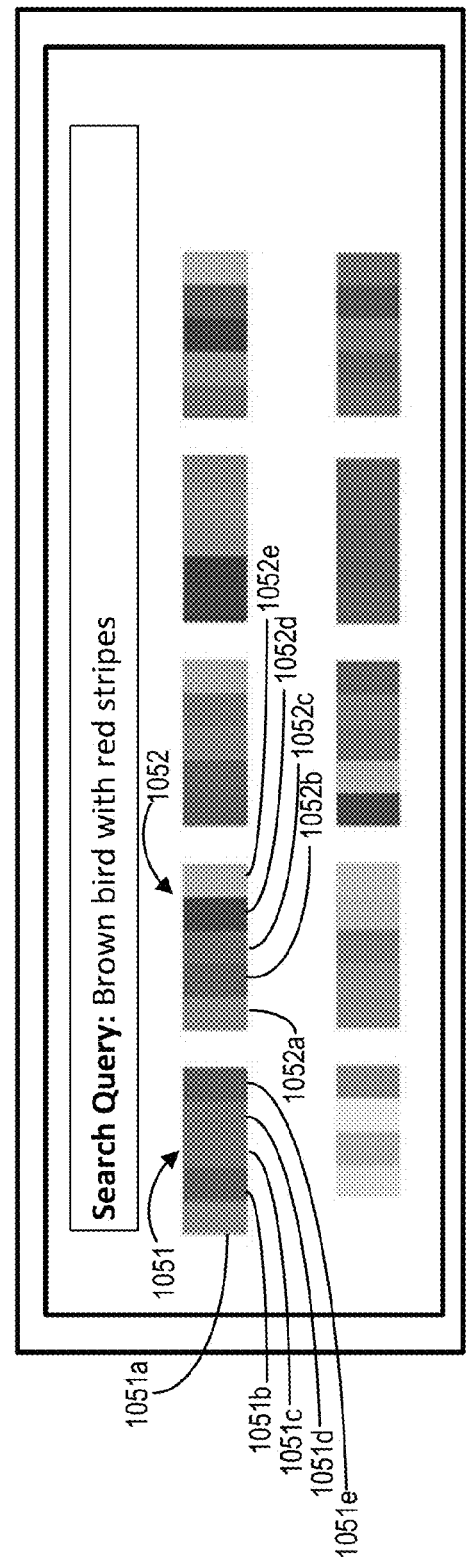

Just as FIGS. 8B and 9B demonstrate superior search results by the text-to-color-palette retrieval system 106 over conventional system search results displayed in FIGS. 8A and 9A, respectively, FIGS. 10A and 10B demonstrate an improvement by the text-to-color-palette retrieval system 106 over conventional systems. For example, in some instances a conventional system returns no search results for a textual color palette search query, as shown in FIG. 10A. The textual search query in FIG. 10A is "brown bird with red stripes." This textual search query has explicit color intent, yet conventional systems return no results (for example, because there are no color palettes in the conventional system color database with metadata tags matching the full textual search query).

In contrast, FIG. 10B shows that the text-to-color-palette retrieval system 106 returns search results for the textual search query "brown bird with red stripes." Furthermore, the search results of the text-to-color-palette retrieval system 106 shown in FIG. 10B are high-quality search results. For example, the first color palette 1051 listed in the search results of the text-to-color-palette retrieval system 106 has the following color swatches: a light red-brown shade in swatch 1051a, a dark red-brown shade in swatch 1051b, a light brown shade in swatch 1051c, an orange-brown shade in swatch 1051d, and dark red-brown shade in swatch 1051e. Continuing through the search results of the text-to-color-palette retrieval system 106, the second color palette 1052 has the following color swatches: a light orange-brown shade in swatch 1052a, a brown shade in swatch 1052b, a red shade in swatch 1052c, a dark brown shade in swatch 1052d, and a light brown shade in swatch 1052e.

Thus, the text-to-color-palette retrieval system 106 not only delivers search results for textual search queries for which conventional systems do not return search results, the text-to-color-palette retrieval system 106 also delivers results that are highly relevant to the color intent of the textual search query. In this example, the search results primarily include shades of brown and red, which would be expected for the textual color palette search query "brown bird with red stripes." This shows that the text-to-color-palette retrieval system 106 can grapple with complex textual search queries and deliver quality results.

Figure 11:
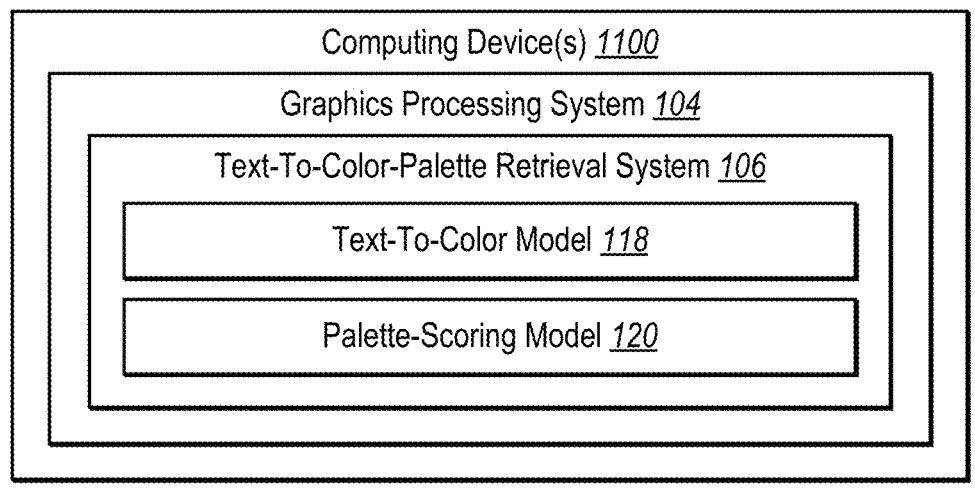
FIG. 11 illustrates a schematic diagram of an example architecture of a text-to-color-palette retrieval system in accordance with one or more embodiments.

Turning now to FIG. 11, additional detail will be provided regarding components and capabilities of one or more embodiments of the text-to-color-palette retrieval system 106. In particular, FIG. 11 illustrates an example text-to-color-palette retrieval system 106 executed by a computing device 1100 (e.g., the server devices(s) 102 or the client device 110). As shown by the embodiment of FIG. 11, the computing device 1100 includes or hosts the graphics processing system 104 and/or the text-to-color-palette retrieval system 106. Furthermore, as shown in FIG. 11, the text-to-color-palette retrieval system 106 includes the text-to-color model 118 and the palette scoring model 120.

Each of the components of the text-to-color-palette retrieval system 106 can include software, hardware, or both. For example, the components can include one or more instructions stored on a computer-readable storage medium and executable by processors of one or more computing devices, such as a client device or server device. When executed by the one or more processors, the computer-executable instructions of the text-to-color-palette retrieval system 106 can cause the computing device(s) 1100 to perform the methods described herein. Alternatively, the components can include hardware, such as a special purpose processing device to perform a certain function or group of functions. Alternatively, the components of the text-to-color-palette retrieval system 106 can include a combination of computer-executable instructions and hardware.

Furthermore, the components of the text-to-color-palette retrieval system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps." To illustrate, the components may be implemented in an application, including but not limited to ADOBE® STOCK, ADOBE® COLOR, ADOBE® CREATIVE CLOUD, ADOBE® ILLUSTRATOR, and ADOBE® PHOTOSHOP. "ADOBE", "ADOBE STOCK", "ADOBE COLOR", "ADOBE CREATIVE CLOUD", "ADOBE ILLUSTRATOR", and "ADOBE PHOTOSHOP" are either registered trademarks or trademarks of Adobe Systems Incorporated in the United States and/or other countries.

Figure 12:
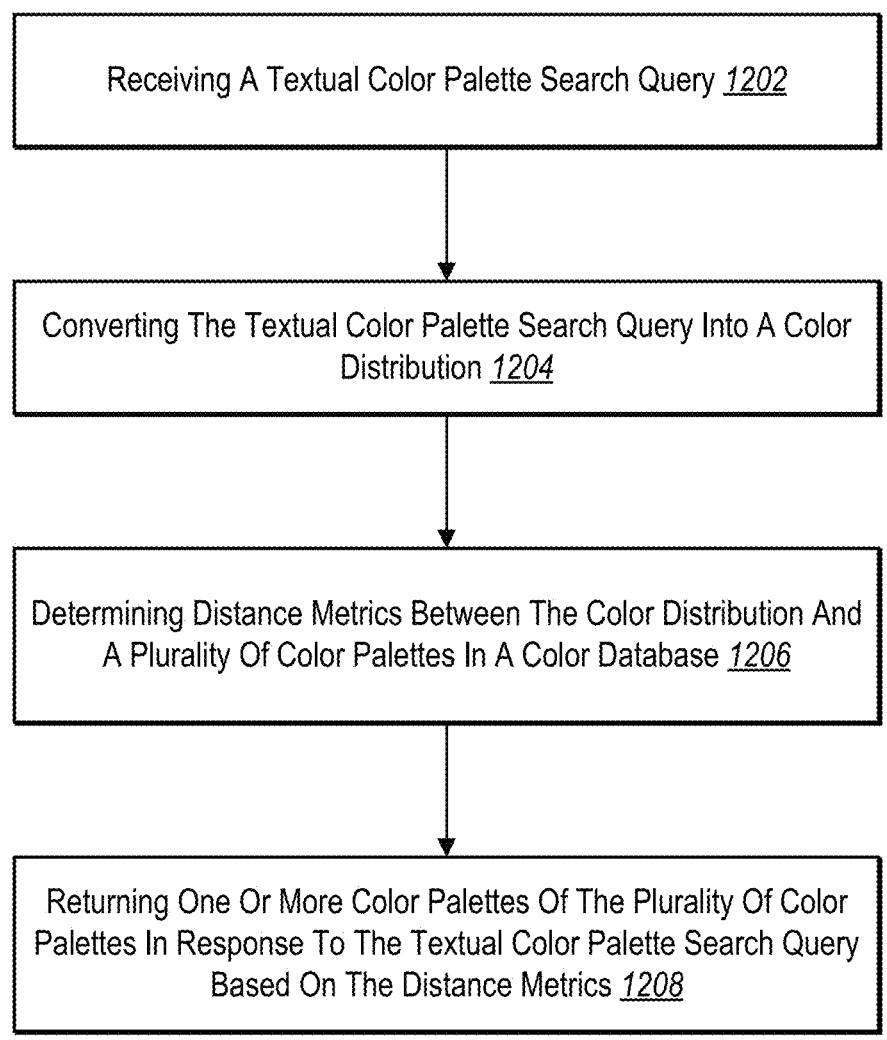
FIG. 12 illustrates a flowchart of a series of acts for scoring color palettes using a text-to-color-palette retrieval system in accordance with one or more embodiments.

FIGS. 1-11, the corresponding text, and the examples provide a number of different methods, systems, devices, and non-transitory computer-readable media of the text-to-color-palette retrieval system 106. In addition to the foregoing, one or more embodiments can also be described in terms of flowcharts comprising acts for accomplishing a particular result, as shown in FIG. 12. FIG. 12 may be performed with more or fewer acts. Further, the acts may be performed in differing orders. Additionally, the acts described herein may be repeated or performed in parallel with one another or parallel with different instances of the same or similar acts.

As mentioned, FIG. 12 illustrates a flowchart of a series of acts 1200 for scoring color palettes in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause the one or more processors to perform the acts of FIG. 12. In some embodiments, a system can perform the acts of FIG. 12.

As shown in FIG. 12, the series of acts 1200 includes an act 1202 for receiving a textual color palette search query. Also, the series of acts 1200 includes an act 1204 for converting the textual color palette search query into a color distribution. For example, the act 1204 includes converting, utilizing a text-to-color model, the textual color palette search query into a color distribution. More specifically, the act 1204 involves converting, utilizing a text-to-color neural network, the textual color palette search query into a color distribution. Additionally, the act 1204, in one or more embodiments, includes assigning weights to the colors of the color distribution based on relevance of the colors of the color distribution to the textual color palette search query. Additionally, the act 1204 involves identifying a subset of colors of the color distribution based on the assigned weights.

Further, the series of acts 1200 includes an act 1206 for determining distance metrics between the color distribution and a plurality of color palettes in a color database. Specifically, the act 1206 includes determining, utilizing a palette scoring model, distance metrics between the color distribution and a plurality of color palettes in a color database. Specifically, the act 1206 involves include prioritizing, from the color database, color palettes with multiple swatches relevant to the textual color palette search query over color palettes with a single swatch relevant to the textual color palette search query. For example, the act 1206 includes identifying swatch matches between colors of the color distribution and unmatched swatches in a color palette of the plurality of color palettes. Each of the swatch matches comprises a color of the color distribution and a swatch of a color palette of the plurality of color palettes.

More particularly, the act 1206 includes assigning a match between a color of the color distribution and an unmatched swatch of a color palette of the plurality of color palettes, such that the unmatched swatch of the color palette of the plurality of color palettes becomes a matched swatch. Specifically, the act 1206 includes determining, for a highest-weighted color of the color distribution, a first matching swatch of a color palette of the plurality of color palettes by identifying a nearest swatch in the color palette to the highest-weighted color. Act 1206 further involves determining, for a second highest-weighted color of the color distribution, a second matching swatch of the color palette by identifying, from the swatches in the color palette minus the first matching swatch, a nearest swatch to the second highest-weighted color. The act 1206 also includes identifying a swatch match between the subset of colors of the color distribution and the unmatched swatches of the plurality of color palettes.

Further, the act 1206 includes determining distances between the colors of the color distribution and matched swatches of the plurality of color palettes. Also, the act 1206 optionally includes assigning weights to colors of the color distribution based on relevance of colors of the color distribution to the textual color palette search query. For example, the act 1206 includes determining the weights utilizing a softmax function of the text-to-color neural network. In addition, the act 1206 optionally includes determining a number of top-weighted colors of the color distribution for determining the distance metrics. For instance, the act 1206 includes determining the top weighted colors of the color distribution by identifying a predetermined number of the top weighted colors of the color distribution.

The act 1206 includes, in one or more embodiments, determining distances between top weighted colors of the color distribution and matched swatches in a color palette of the plurality of color palettes. For example, the act 1206 includes determining a first distance between the highest-weighted color and the first matching swatch. Act 1206 includes determining a second distance between the second highest-weighted color and the second matching swatch. The act 1206 includes combining the distances between the top weighted colors of the color distribution and the matched swatches in the color palette to determine a distance metric for the color palette. For instance, the act 1206 includes combining the first distance and the second distance. Further, the act 1206 optionally includes weighting the first distance and the second distance based on weights assigned to the highest-weighted color and the second highest-weighted color. Additionally, the act 1206 includes summing the weighted first distance and the weighted second distance. In addition to the foregoing, the method 1200 optionally includes incorporating static qualities of the plurality of color palettes to determine the distance metrics.

Additionally, the series of acts 1200 includes an act 1208 of returning one or more color palettes of the plurality of color palettes in response to the textual color palette search query based on the distance metrics. Specifically, the act 1208 includes returning one or more color palettes of the plurality of color palettes in response to the textual color palette search query based on distance metrics of the plurality of color palettes. Optionally, the act 1208 includes generating a color palette from the color distribution. For example, the act 1208 includes generating a color palette from the color distribution utilizing the top weighted colors of the color distribution. The act 1208 includes returning the generated color palette with the one or more color palettes in response to the textual color palette search query.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa).

For example, computer-executable instructions or data structures received over a network or data link can be buffered in RAM within a network interface generator (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer-executable instructions may be, for example, binaries, format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 13:
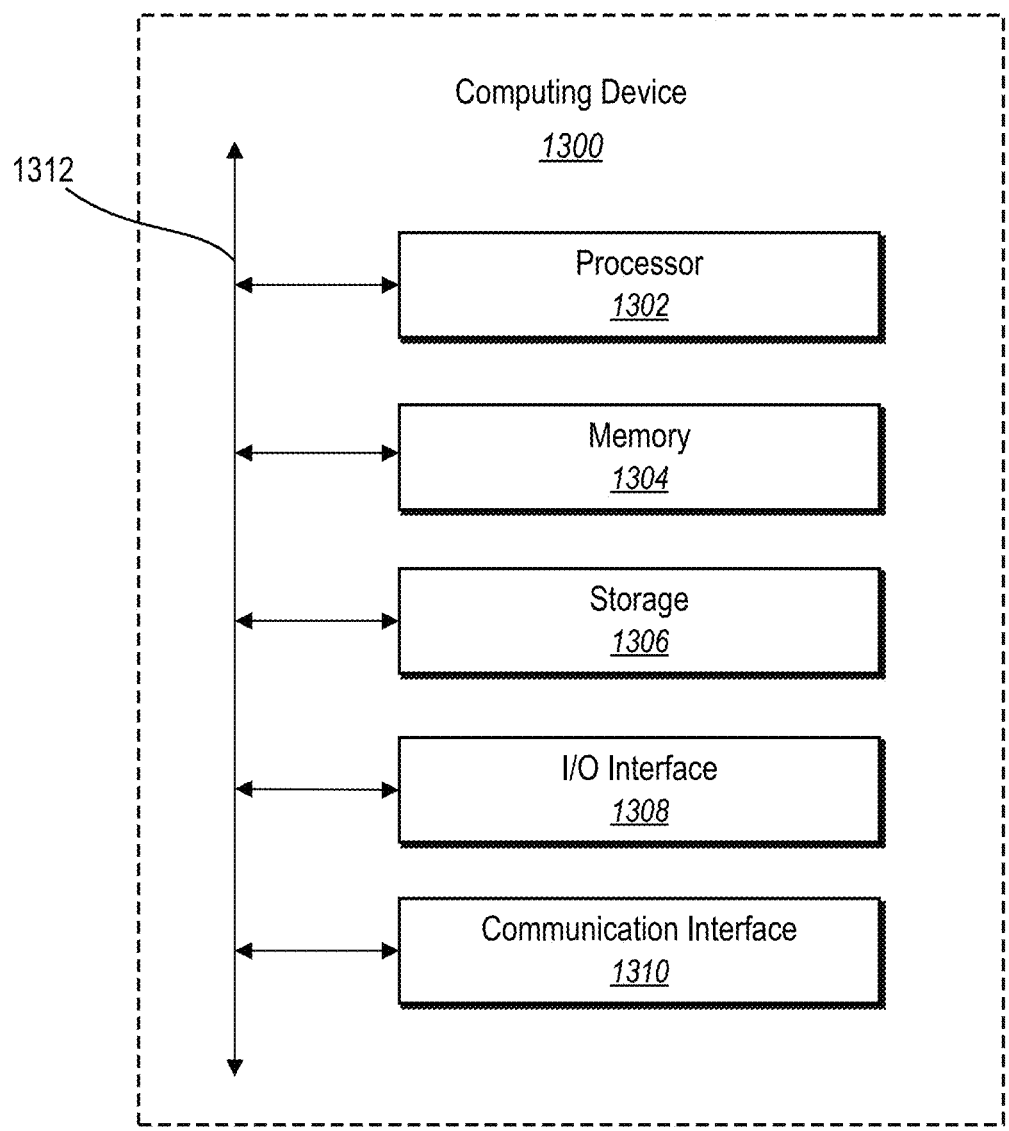
FIG. 13 illustrates a block diagram of an example computing device for implementing one or more embodiments of the present disclosure.

FIG. 13 illustrates a block diagram of an example computing device 1300 that may be configured to perform one or more of the processes described above. One will appreciate that one or more computing devices, such as the computing device 1300 may represent the computing devices described above (e.g., computing device(s) 1100, server device(s) 102, and client device 110). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes the memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes the storage device 1306 for storing data or instructions. As an example, and not by way of limitation, the storage device 1306 can include a non-transitory storage medium described above. The storage device 1306 may include a hard disk drive ("HDD"), flash memory, a Universal Serial Bus ("USB") drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller ("NIC") or network adapter for communicating with an Ethernet or other wire-based network or a wireless NIC ("WNIC") or wireless adapter for communicating with a wireless network, such as a WI-FI. The computing device 1300 can further include the bus 1312. The bus 1312 can include hardware, software, or both that connects components of computing device 1300 to each other.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
receiving a textual color palette search query;
converting, utilizing a text-to-color model, the textual color palette search query into a color distribution;
determining, utilizing a palette scoring model, a plurality of distance metrics between the color distribution and a plurality of color palettes in a color database by:
identifying swatch matches between colors of the color distribution and unmatched swatches of the plurality of color palettes; and
determining distances between the colors of the color distribution and matched swatches of the plurality of color palettes; and
returning one or more color palettes of the plurality of color palettes in response to the textual color palette search query based on the plurality of distance metrics.

2. The computer-implemented method of claim 1, wherein identifying the swatch matches between colors of the color distribution and unmatched swatches of the plurality of color palettes comprises assigning a match between a color of the color distribution and an unmatched swatch of a color palette of the plurality of color palettes, such that the unmatched swatch of the color palette of the plurality of color palettes becomes a matched swatch.

3. The computer-implemented method of claim 2, further comprising assigning weights to the colors of the color distribution based on relevance of the colors of the color distribution to the textual color palette search query.

4. The computer-implemented method of claim 3, further comprising identifying a subset of colors of the color distribution based on the assigned weights;
wherein identifying the swatch matches between the colors of the color distribution and the unmatched swatches of the plurality of color palettes comprises identifying a swatch match between the subset of colors of the color distribution and the unmatched swatches of the plurality of color palettes.

5. The computer-implemented method of claim 1, further comprising:
generating a color palette from the color distribution; and
returning the generated color palette with the one or more color palettes in response to the textual color palette search query.

6. A non-transitory computer-readable medium storing executable instructions, which when executed by at least one processor, cause the at least one processor to perform operations comprising:
receiving a textual color palette search query;
converting, utilizing a text-to-color model, the textual color palette search query into a color distribution;
determining, utilizing a palette scoring model, a plurality of distance metrics between the color distribution and a plurality of color palettes in a color database by:
identifying swatch matches between colors of the color distribution and unmatched swatches of the plurality of color palettes; and
determining distances between the colors of the color distribution and matched swatches of the plurality of color palettes; and
returning one or more color palettes of the plurality of color palettes in response to the textual color palette search query based on the plurality of distance metrics.

7. The non-transitory computer-readable medium of claim 6, wherein the operations further comprise prioritizing, from the color database, color palettes with multiple swatches relevant to the textual color palette search query over color palettes with a single swatch relevant to the textual color palette search query.

8. The non-transitory computer-readable medium of claim 6, wherein:
identifying the swatch matches between the colors of the color distribution and unmatched swatches of the plurality of color palettes comprises:
determining, for a highest-weighted color of the color distribution, a first matching swatch of a color palette of the plurality of color palettes by identifying a nearest swatch in the color palette to the highest-weighted color; and
determining, for a second highest-weighted color of the color distribution, a second matching swatch of the color palette by identifying, from the swatches in the color palette minus the first matching swatch, a nearest swatch to the second highest-weighted color; and determining the distances between the colors of the color distribution and the matched swatches of the plurality of color palettes comprises:
    determining a first distance between the highest-weighted color and the first matching swatch; and
    determining a second distance between the second highest-weighted color and the second matching swatch.

9. The non-transitory computer-readable medium of claim 6, wherein the operations further comprise assigning weights to the colors of the color distribution based on relevance of the colors of the color distribution to the textual color palette search query.

10. The non-transitory computer-readable medium of claim 9, wherein:
    the operations further comprise identifying a subset of colors of the color distribution based on the assigned weights; and
    identifying the swatch matches between the colors of the color distribution and the unmatched swatches of the plurality of color palettes comprises identifying a swatch match between the subset of colors of the color distribution and the unmatched swatches of the plurality of color palettes.

11. The non-transitory computer-readable medium of claim 6, wherein the operations further comprise:
    generating a color palette from the color distribution; and
    returning the generated color palette with the one or more color palettes in response to the textual color palette search query.

12. The non-transitory computer-readable medium of claim 6, further comprising instructions that, when executed by the at least one processor, cause the at least one processor to perform operations comprising incorporating static qualities of the plurality of color palettes to determine the plurality of distance metrics.

13. A system comprising:
    one or more memory devices; and
    one or more processors coupled to the one or more memory devices that cause the system to perform operations comprising:
        receiving a textual color palette search query;
        converting, using a text-to-color neural network, the textual color palette search query into a color distribution;
        assigning weights to colors of the color distribution based on relevance of the colors of the color distribution to the textual color palette search query;
        identifying swatch matches between the colors of the color distribution and unmatched swatches in a color palette of a plurality of color palettes;
        determining distances between top weighted colors of the color distribution and matched swatches in the color palette of the plurality of color palettes;
        combining the distances between the top weighted colors of the color distribution and the matched swatches in the color palette to determine a distance metric for the color palette; and
        returning one or more color palettes of the plurality of color palettes in response to the textual color palette search query based on a plurality of distance metrics of the plurality of color palettes.

14. The system of claim 13, wherein each of the swatch matches comprises a color of the color distribution and a swatch of a color palette of the plurality of color palettes.

15. The system of claim 13, wherein the operations further comprise determining the weights utilizing a softmax function of the text-to-color neural network.

16. The system of claim 15, wherein the operations further comprise determining the top weighted colors of the color distribution by identifying a predetermined number of the top weighted colors of the color distribution.

17. The system of claim 16, wherein:
    identifying the swatch matches between the colors of the color distribution and unmatched swatches in the color palette of the plurality of color palettes comprises:
        determining, for a highest-weighted color of the color distribution, a first matching swatch by identifying a nearest swatch in the color palette to the highest-weighted color; and
        determining, for a second highest-weighted color of the color distribution, a second matching swatch by identifying, from the swatches in the color palette minus the first matching swatch, a nearest swatch to the second highest-weighted color; and
    determining the distances between the top weighted colors of the color distribution and the matched swatches in the color palette comprises:
        determining a first distance between the highest-weighted color and the first matching swatch; and
        determining a second distance between the second highest-weighted color and the second matching swatch.

18. The system of claim 17, wherein combining the distances between the top weighted colors of the color distribution and the matched swatches in the color palette to determine the distance metric for the color palette comprises combining the first distance and the second distance.

19. The system of claim 18, wherein:
    the operations further comprise weighting the first distance and the second distance based on weights assigned to the highest-weighted color and the second highest-weighted color; and
    combining the first distance and the second distance comprises summing the weighted first distance and the weighted second distance.

20. The system of claim 13, wherein the operations further comprise:
    generating a color palette from the color distribution utilizing the top weighted colors of the color distribution; and
    returning the generated color palette with the one or more color palettes in response to the textual color palette search query.

* * * * *